United States Patent
Fujimoto et al.

(10) Patent No.: US 9,560,356 B2
(45) Date of Patent: Jan. 31, 2017

(54) IMAGE PROCESSING APPARATUS, IMAGE PROCESSING METHOD, AND IMAGE PROCESSING SYSTEM

(71) Applicant: Sony Corporation, Tokyo (JP)

(72) Inventors: Yuji Fujimoto, Kanagawa (JP); Junichiro Enoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/767,279

(22) Filed: Feb. 14, 2013

(65) Prior Publication Data

US 2013/0215973 A1 Aug. 22, 2013

(30) Foreign Application Priority Data

Feb. 22, 2012 (JP) .................. 2012-035992

(51) Int. Cl.
| | |
|---|---|
| H04N 7/26 | (2006.01) |
| H04N 19/90 | (2014.01) |
| H04N 21/234 | (2011.01) |
| H04N 21/2343 | (2011.01) |
| H04N 21/2365 | (2011.01) |
| H04N 21/434 | (2011.01) |
| H04N 21/44 | (2011.01) |
| H04N 21/4402 | (2011.01) |
| H04N 19/70 | (2014.01) |
| H04N 19/149 | (2014.01) |
| H04N 19/174 | (2014.01) |
| H04N 19/40 | (2014.01) |

(52) U.S. Cl.
CPC ...... *H04N 19/00945* (2013.01); *H04N 19/149* (2014.11); *H04N 19/174* (2014.11); *H04N 19/40* (2014.11); *H04N 19/70* (2014.11); *H04N 21/2365* (2013.01); *H04N 21/23412* (2013.01); *H04N 21/234354* (2013.01); *H04N 21/234363* (2013.01); *H04N 21/4347* (2013.01); *H04N 21/44012* (2013.01); *H04N 21/440263* (2013.01)

(58) Field of Classification Search
None
See application file for complete search history.

(56) References Cited

U.S. PATENT DOCUMENTS

| | | | | |
|---|---|---|---|---|
| 5,612,900 A | * | 3/1997 | Azadegan et al. | 709/247 |
| 5,956,088 A | * | 9/1999 | Shen et al. | 375/240.25 |
| 6,275,536 B1 | * | 8/2001 | Chen et al. | 375/240.25 |
| 6,332,003 B1 | * | 12/2001 | Matsuura | H04N 19/30 375/240.23 |
| 6,481,012 B1 | * | 11/2002 | Gordon et al. | 725/54 |
| 6,870,883 B2 | * | 3/2005 | Iwata | H04N 19/61 375/240.01 |

(Continued)

FOREIGN PATENT DOCUMENTS

| | | |
|---|---|---|
| JP | 2002-064818 A | 2/2002 |
| JP | 2011259361 A * | 12/2011 |

*Primary Examiner* — Tracy Y Li
*Assistant Examiner* — Mohammad J Rahman
(74) *Attorney, Agent, or Firm* — Chip Law Group

(57) ABSTRACT

An image processing apparatus includes, using encoded streams produced by individually encoding macro blocks arranged in a horizontal direction into a same slice for a plurality of image contents, a stream combination section configured to generate an encoded stream of a multi-image playback image displaying the plurality of image contents at the same time.

13 Claims, 22 Drawing Sheets

(56) References Cited

U.S. PATENT DOCUMENTS

| | | | |
|---|---|---|---|
| 6,879,634 B1* | 4/2005 | Oz et al. | 375/240.26 |
| 6,934,333 B1* | 8/2005 | Plissonneau | H04N 5/272 |
| | | | 348/E5.058 |
| 7,746,778 B2* | 6/2010 | Chilukoor et al. | 370/230.1 |
| 7,983,342 B2* | 7/2011 | Saha et al. | 375/240.23 |
| 8,073,437 B2* | 12/2011 | Oh et al. | 455/418 |
| 8,254,455 B2* | 8/2012 | Wu | H04N 19/176 |
| | | | 375/240.16 |
| 8,269,763 B2* | 9/2012 | Singer | 345/419 |
| 8,442,121 B2* | 5/2013 | Song et al. | 375/240.25 |
| 9,042,456 B2* | 5/2015 | Cho | H04N 19/102 |
| | | | 375/240.01 |
| 2002/0009287 A1* | 1/2002 | Ueda | 386/68 |
| 2002/0031184 A1* | 3/2002 | Iwata | H04N 19/61 |
| | | | 375/240.23 |
| 2003/0099294 A1* | 5/2003 | Wang et al. | 375/240.15 |
| 2004/0042673 A1* | 3/2004 | Boon | 382/239 |
| 2004/0081241 A1* | 4/2004 | Kadono et al. | 375/240.23 |
| 2004/0114817 A1* | 6/2004 | Jayant | H04N 19/00 |
| | | | 382/239 |
| 2005/0262510 A1* | 11/2005 | Parameswaran et al. | 718/105 |
| 2006/0233525 A1* | 10/2006 | Shibata | H04N 19/70 |
| | | | 386/329 |
| 2007/0140345 A1* | 6/2007 | Osamoto | H04N 19/51 |
| | | | 375/240.16 |
| 2007/0171975 A1* | 7/2007 | Smith et al. | 375/240.13 |
| 2008/0313484 A1* | 12/2008 | Ratakonda et al. | 713/375 |
| 2009/0219989 A1* | 9/2009 | Tanaka et al. | 375/240.01 |
| 2010/0306344 A1* | 12/2010 | Athas | H04L 67/02 |
| | | | 709/219 |
| 2012/0163452 A1* | 6/2012 | Horowitz | 375/240.12 |
| 2013/0077672 A1* | 3/2013 | Sato | 375/240.02 |
| 2013/0107940 A1* | 5/2013 | Sato | 375/240.02 |
| 2014/0320021 A1* | 10/2014 | Conwell | H04W 4/001 |
| | | | 315/152 |

* cited by examiner

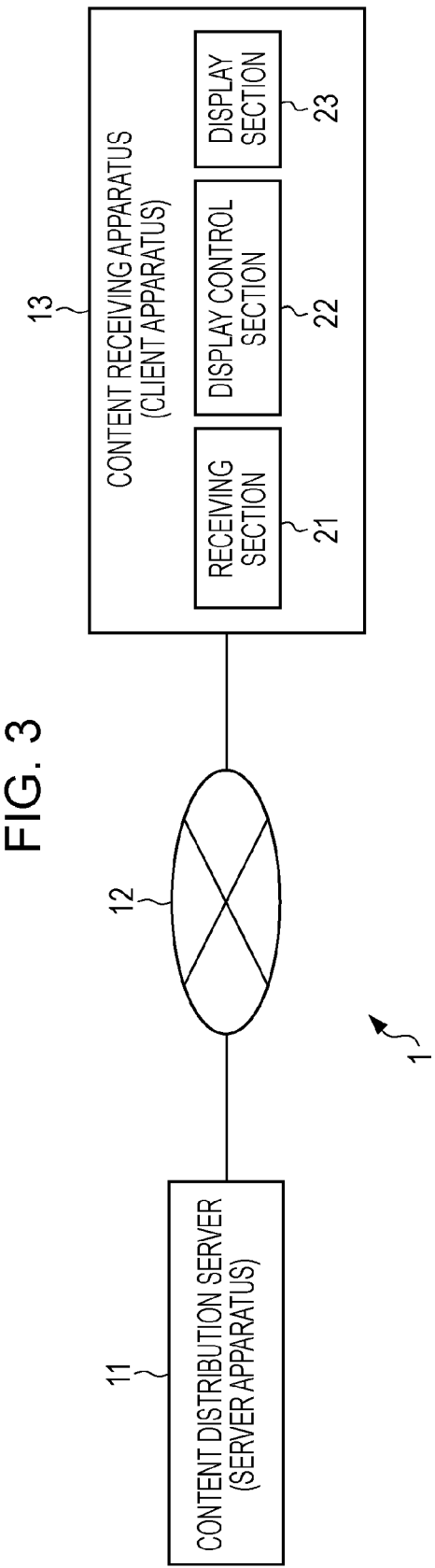
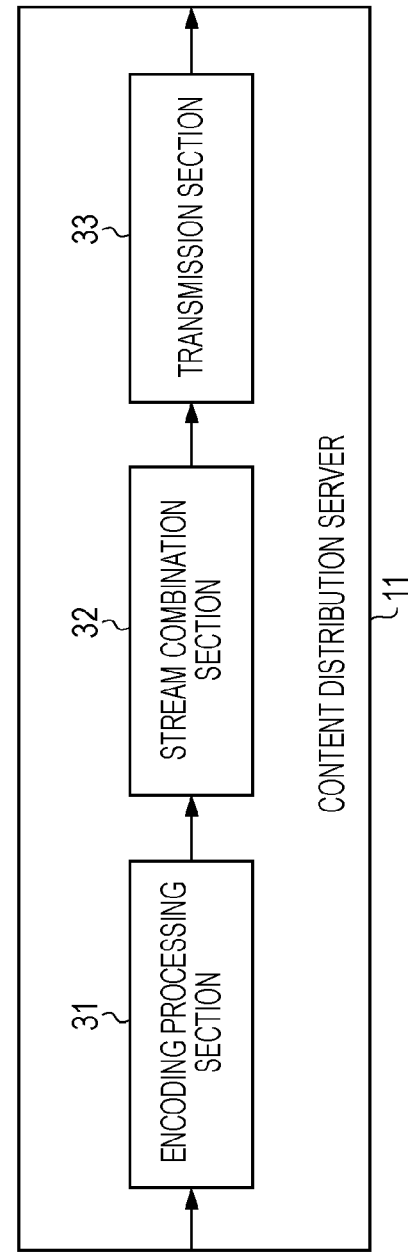

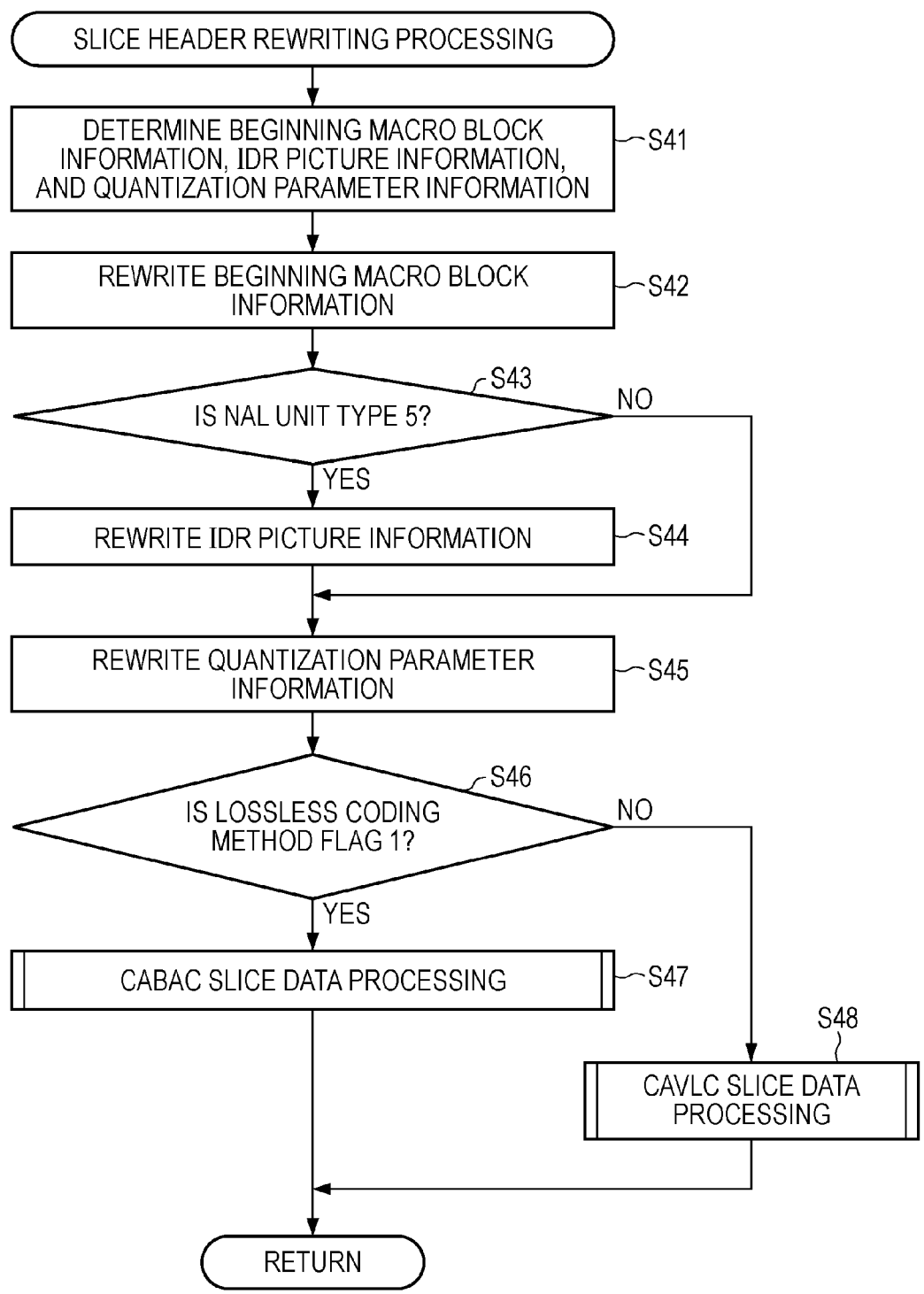

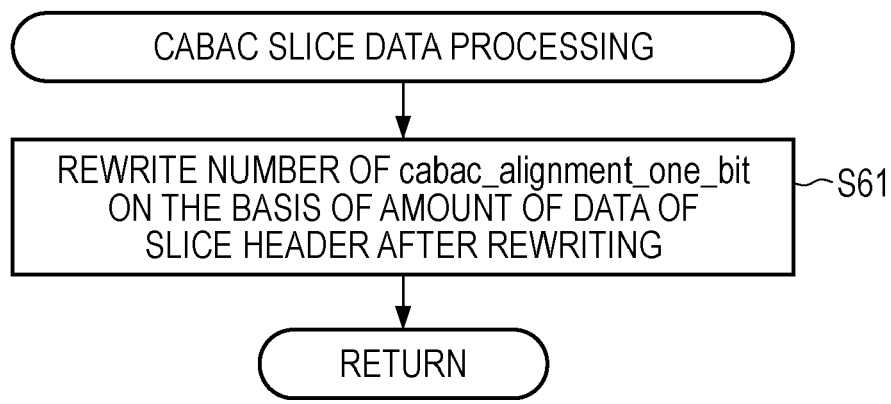
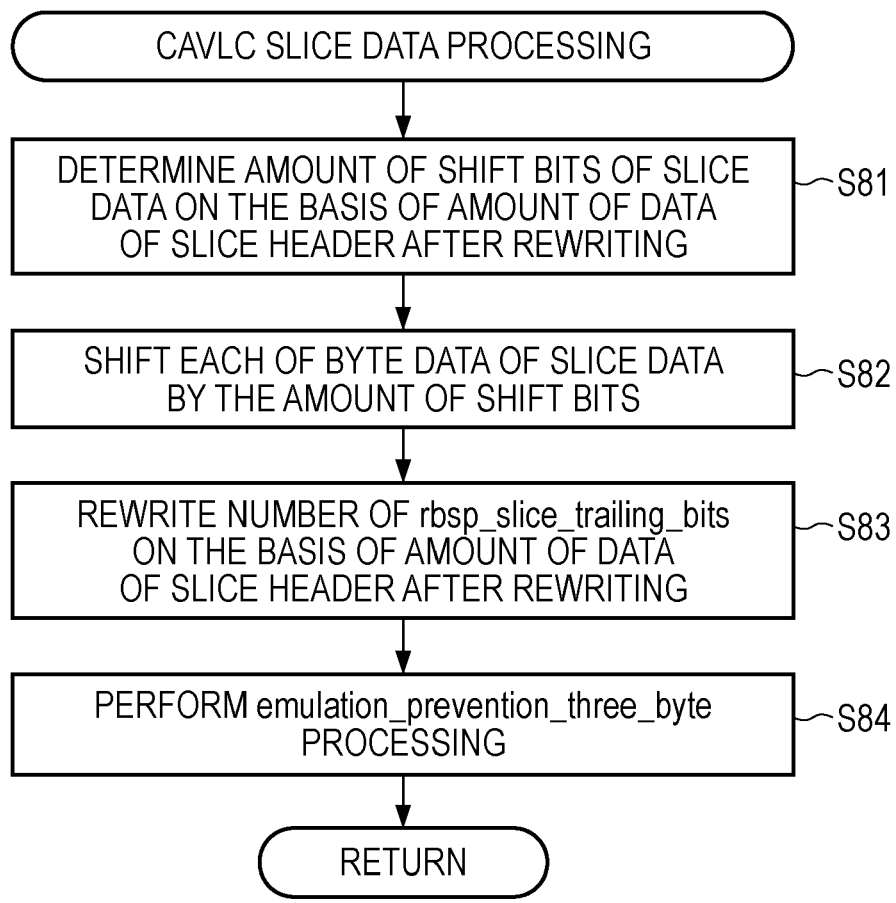

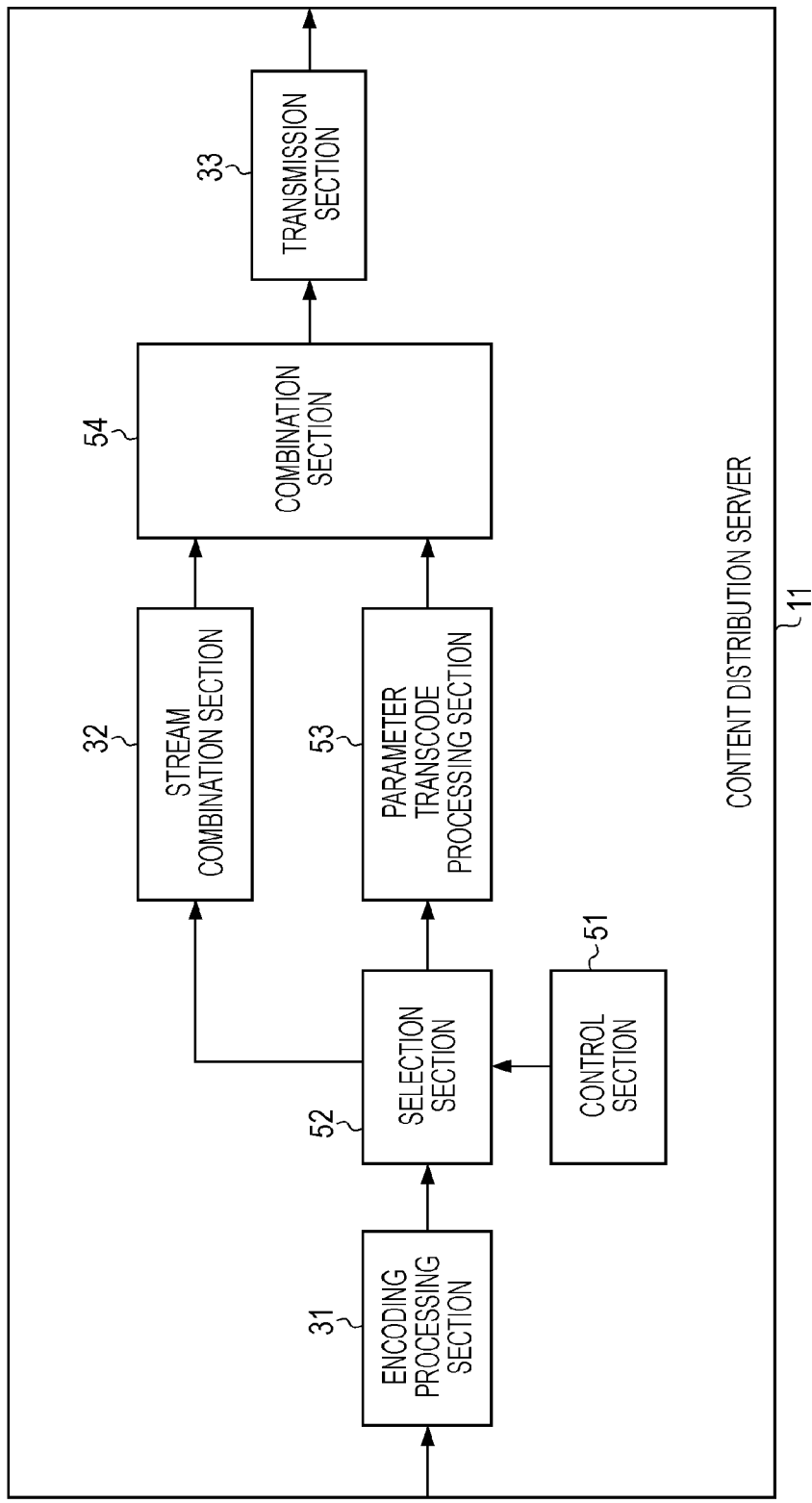

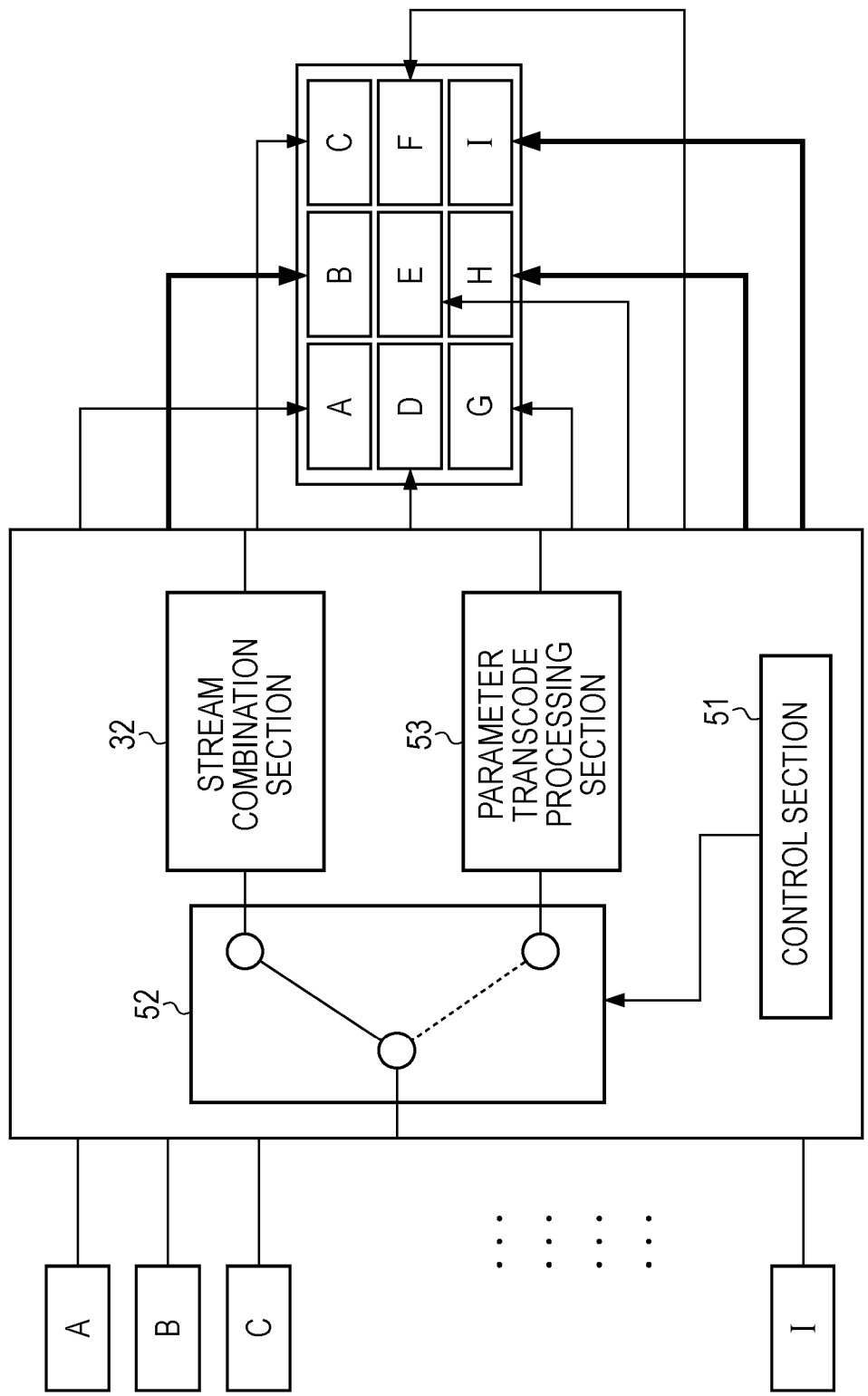

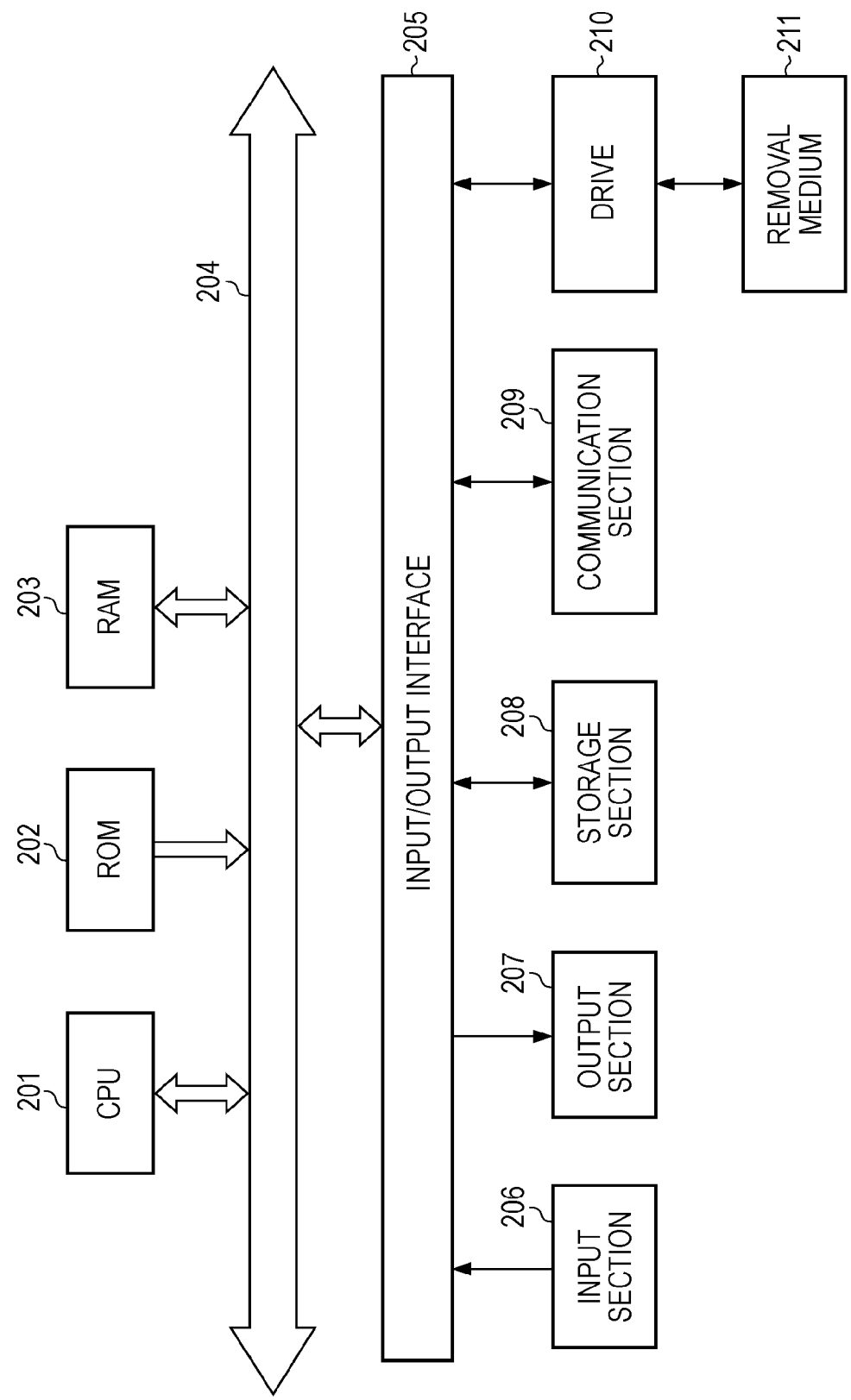

IMAGE PROCESSING APPARATUS, IMAGE PROCESSING METHOD, AND IMAGE PROCESSING SYSTEM

BACKGROUND

The present disclosure relates to an image processing apparatus, an image processing method, and an image processing system. More particularly, the present disclosure relates to an image processing apparatus, an image processing method, and an image processing system, which has made it possible to reduce processing load at the time of generating a multi-image playback image.

Digitization of contents has progressed, and infrastructure capable of transmitting images has been improved, and thereby image distribution through the Internet is becoming widespread. Recently, as apparatuses at receiving sides, television receivers with network connection capabilities are on the rise in addition to personal computers. Thus, it becomes possible to view distributed image contents by a television receiver. Also, in recent years, cloud services have been developed, and thus various channels including private contents have been provided to viewers through a network. Accordingly, demands have become higher for multi-image playback systems, as illustrated in FIG. 1, that allow viewers to view a plurality of image contents at the same time, and to easily search an image content that the viewers want.

In a multi-image playback system in FIG. 1, a multi-image playback image that is displayed on a screen includes a plurality of image contents. Among the plurality of image contents displayed, a main image contents, which is an image content to be mainly viewed, is disposed at a center of the screen with a maximum size. And the other image contents, which are selectable (changeable) and smaller in size than the main image contents, are disposed on the periphery of the main image contents. The selectable image contents are, for example, video contents, such as a TV broadcasting channel, a Web screen, a movie, etc., a TV chat screen, etc., and are obtained from a cloud (network), for example.

As a first method of achieving display of such a multi-image playback image, there is a method in which a server in a cloud distributes a plurality of encoded streams corresponding to a plurality of image contents, respectively. A client apparatus receives and decodes the plurality of encoded streams, and performs combination processing so as to generate a multi-image playback image. For example, Japanese Unexamined Patent Application Publication No. 2002-064818 has disclosed a multi-image playback image in which a plurality of ES (Elementary Streams) are received, and an ES having a high priority is allowed to be assigned to a large display area on the basis of a display priority.

SUMMARY

However, in order to distribute a plurality of encoded stream, a substantially wide transmission band becomes necessary. Also, it becomes necessary for client apparatuses to have capabilities to decode a plurality of encoded stream at the same time, and to perform combination processing, so that the client apparatuses become expensive.

As a second method of achieving display of multi-image playback images beside the above, there is a method in which a server generates and distributes a multi-image playback image as one encoded stream as illustrated in FIG. 2. In this case, the server once decodes a plurality of image contents to be combined, resizes the images, and then re-encodes the image contents after combining the images so as to generate an encoded stream of a multi-image playback image. Accordingly, processing load on the server becomes substantially large.

The present technique has been made in view of these circumstances, and it is desirable to reduce processing load at the time of generating a multi-image playback image.

According to an embodiment of the present disclosure, there is provided an image processing apparatus including, using encoded streams produced by individually encoding macro blocks arranged in a horizontal direction into a same slice for a plurality of image contents, a stream combination section configured to generate an encoded stream of a multi-image playback image displaying the plurality of image contents at the same time.

According to another embodiment of the present disclosure, there is provided a method of processing an image corresponding to the image processing apparatus according to the above-described embodiment of the present disclosure.

By an embodiment of the present technique, using encoded streams produced by individually encoding macro blocks arranged in a horizontal direction into a same slice for a plurality of image contents, an encoded stream of a multi-image playback image that displays a plurality of the image contents at the same time is generated.

According to another embodiment of the present disclosure, there is provided an image processing system including: a server apparatus including, using encoded streams produced by individually encoding macro blocks arranged in a horizontal direction into a same slice for a plurality of image contents, a stream combination section configured to generate an encoded stream of a multi-image playback image displaying the plurality of image contents at the same time, and a transmission section configured to transmit the encoded stream of the multi-image playback image generated by the stream combination section; and a client apparatus including, a receiving section configured to receive the encoded stream of the multi-image playback image transmitted from the transmission section, and a display control section configured to display the multi-image playback image on a predetermined display section on the basis of the encoded stream of the multi-image playback image received by the receiving section.

In the other embodiment of the present technique, using encoded streams produced by individually encoding macro blocks arranged in a horizontal direction into a same slice for a plurality of image contents, a server apparatus generates an encoded stream of a multi-image playback image displaying a plurality of the image contents at the same time, and transmits the encoded stream of the multi-image playback image. Also, a client apparatus receives the encoded stream of the multi-image playback image transmitted from the server apparatus, and displays the multi-image playback image on a predetermined display section on the basis of the encoded stream of the multi-image playback image.

In this regard, it is possible to achieve the above-described image processing apparatus and image processing system by causing a computer to execute a program.

Also, in order to achieve an image processing apparatus according to an embodiment and an image processing system according to the other embodiment, it is possible to provide a program to be executed on a computer by being transmitted through a transmission medium, or by being recorded on a recording medium.

By the present technique, it is possible to reduce processing load at the time of generating a multi-image playback image.

BRIEF DESCRIPTION OF THE DRAWINGS

FIG. 3 is an example of a configuration of a multi-image playback system, to which the present technique is applied, according to a first embodiment;

FIG. 4 is a block diagram illustrating an example of a configuration of the content distribution server in FIG. 3;

FIG. 11 is a flowchart illustrating details of the slice header rewriting processing in FIG. 10;

FIG. 12 is a flowchart illustrating details of slice data processing of CABAC in FIG. 11;

FIG. 13 is a flowchart illustrating details of slice data processing of CAVLC in FIG. 11;

FIG. 14 is a block diagram illustrating an example of a configuration of a content distribution server in a multi-image playback system, to which the present technique is applied, according to a second embodiment;

FIG. 15 is an explanatory diagram of an overview of processing in the content distribution server in FIG. 14;

FIG. 25 is a block diagram illustrating an example of a hardware configuration of a computer.

DETAILED DESCRIPTION OF EMBODIMENTS

First Embodiment

Figure 1:
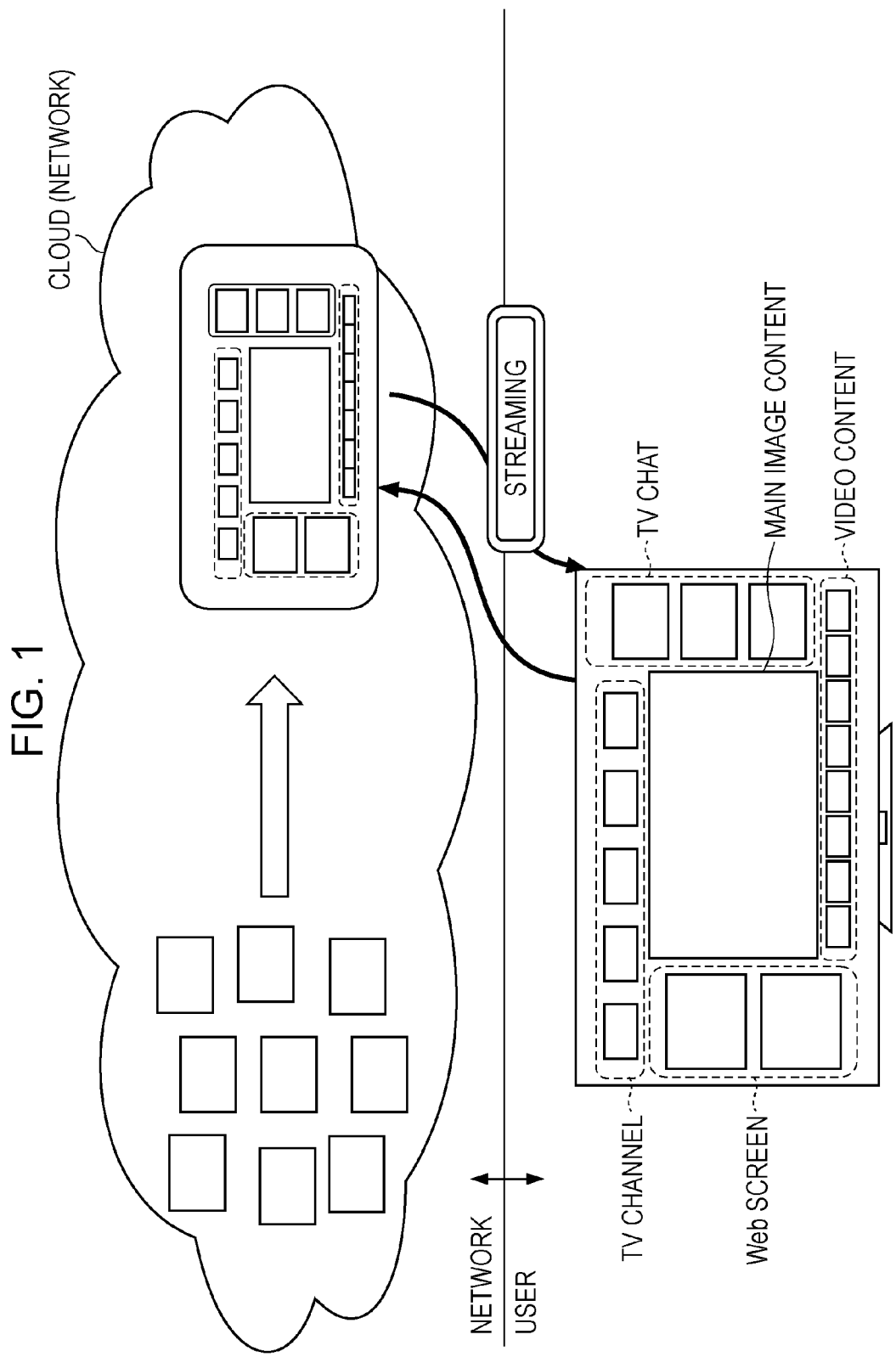
FIG. 1 is an explanatory diagram of a multi-image playback system.
Figure 2:
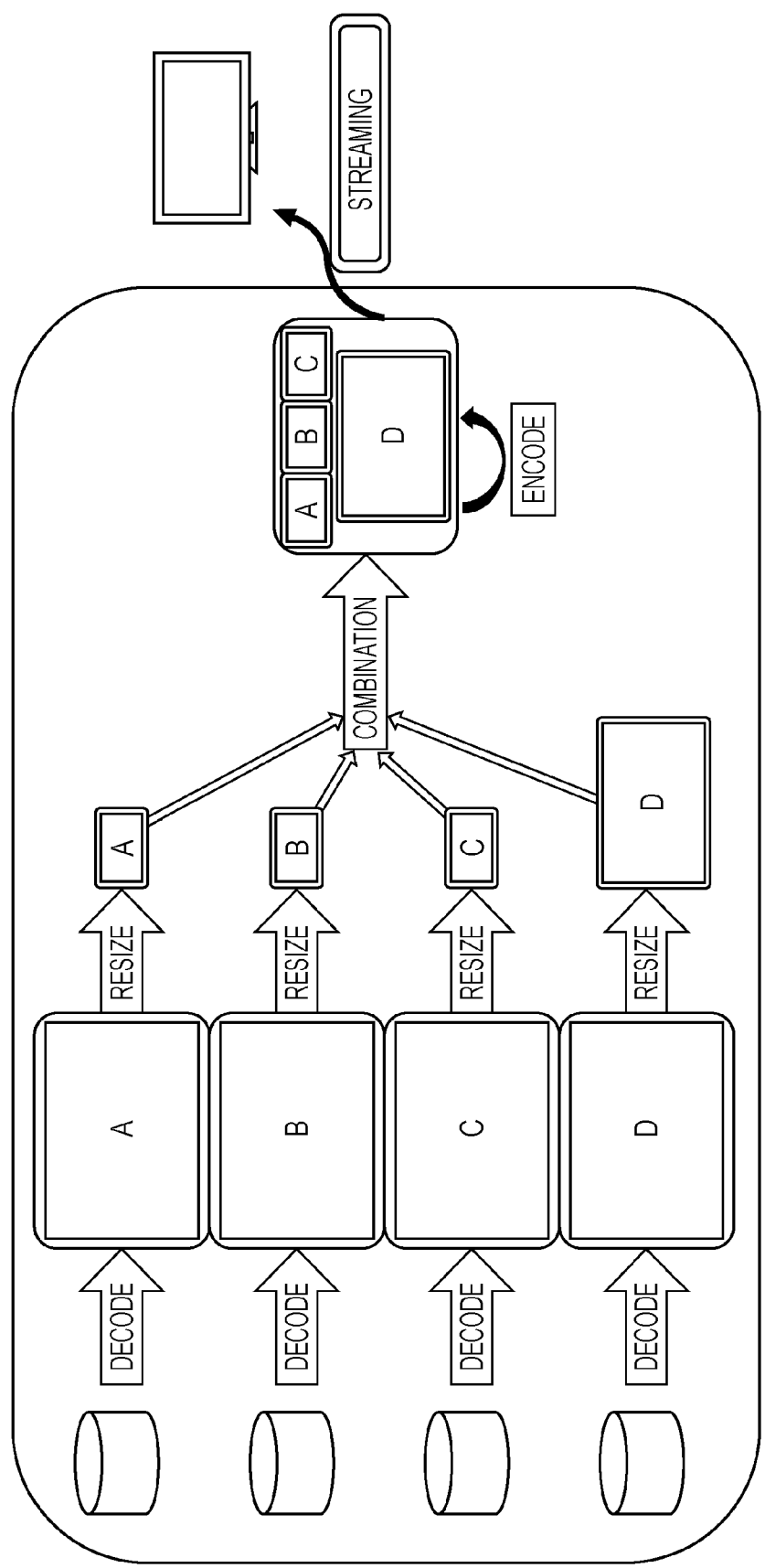
FIG. 2 is a diagram illustrating an example of distributing an encoded stream of a multi-image playback image.

Example of Configuration of Multi-Image Playback System According to First Embodiment FIG. 3 illustrates an example of a configuration of a multi-image playback system, to which the present technique is applied, according to a first embodiment.

A multi-image playback system 1, as an image processing system, includes a content distribution server 11, which distributes image contents, and a content receiving apparatus 13 connected thereto through a network 12.

The content distribution server 11 combines encoded streams of a plurality of image contents into an encoded stream of one-screen multi-image playback image, and distributes the encoded stream to the content receiving apparatus 13, which is a client.

The content receiving apparatus 13 includes a receiving section 21, a display control section 22, and a display section 23. The receiving section 21 of the content receiving apparatus 13 receives an encoded stream distributed by the content distribution server 11 through a network 12, such as the Internet, etc. And, the display control section 22 displays a multi-image playback image based on the received encoded stream on the display section 23, such as a liquid crystal display, etc.

In this regard, the content receiving apparatus 13 may not include the display section 23, and may display the multi-image playback image on a display device connected to the content receiving apparatus 13. Also, the content receiving apparatus 13 may include, for example, a television receiver, a STB (Set Top Box), or a personal computer, etc., that has a network connection function.

Also, only one unit of the content receiving apparatus 13 is illustrated in FIG. 3, but in reality, a plurality of (a large number of) content receiving apparatuses 13 are connected to the network 12, and the content distribution server 11 performs multicast transmission of the encoded stream to the plurality of content receiving apparatuses 13.

Example of Configuration of Content Distribution Server

FIG. 4 is a block diagram illustrating an example of a configuration of the content distribution server 11 in FIG. 3.

As illustrated in FIG. 4, the content distribution server 11 includes an encoding processing section 31, a stream combination section 32, and a transmission section 33.

The encoding processing section 31 of the content distribution server 11 receives and decodes an encoded stream of a plurality of image contents in the H.264/AVC (Advanced Video Coding) method, etc. The encoding processing section 31 individually performs re-encoding on macro blocks arranged in the horizontal direction of the plurality of image contents obtained as a result of the decoding as a same slice. At this time, the encoding processing section 31 sets picture types of the encoded stream of each of the image contents played back at the same time identical. That is to say, a GOP (Group Of Picture) structure of the encoded stream of the individual image contents is the same. The encoding processing section 31 supplies the encoded stream of the plurality of image contents obtained as a result of the re-encoding to the stream combination section 32.

The stream combination section 32 rewrites and combines slice headers of the encoded streams of the plurality of image contents supplied from the encoding processing section 31 so as to generate an encoded stream of a multi-image playback image, and supplies the encoded stream to the transmission section 33.

The transmission section 33 transmits the encoded stream of the multi-image playback image to the content receiving apparatus 13 in FIG. 3.

Description of Re-Encoding by Encoding Processing Section

Figure 5:
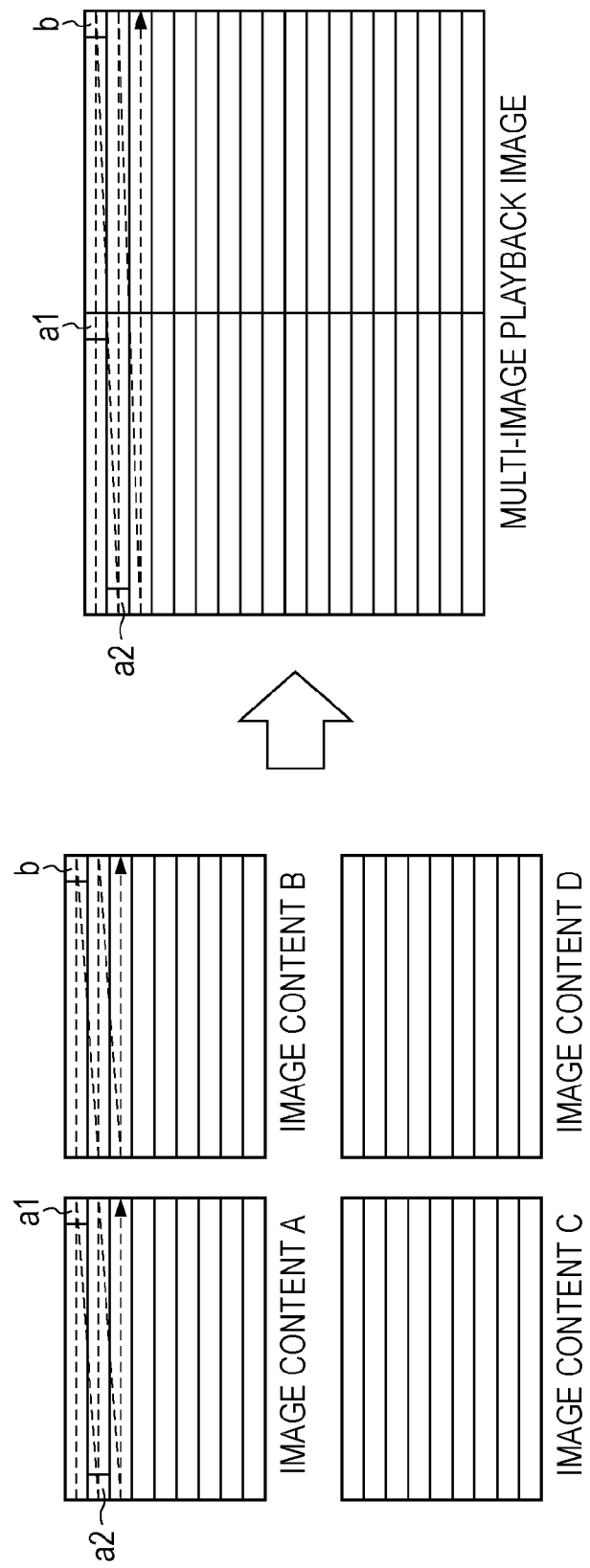
FIG. 5 is an explanatory diagram of re-encoding in the encoding processing section in FIG. 4.
Figure 6:
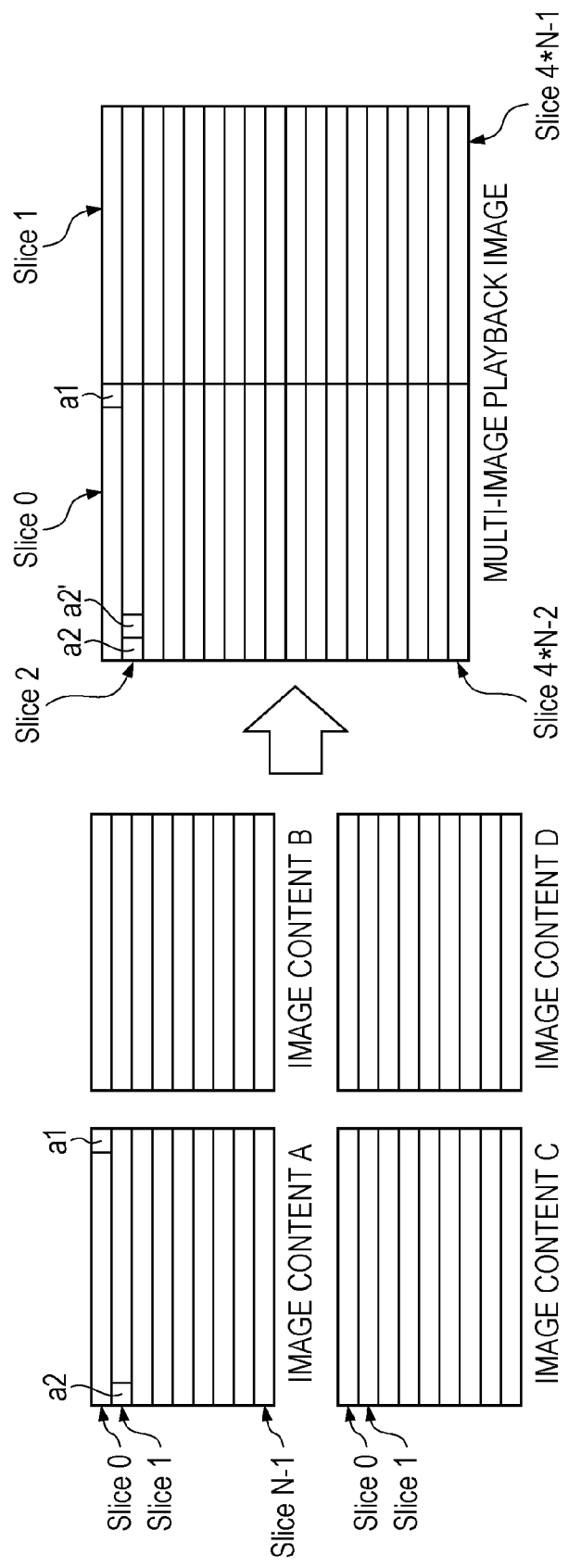
FIG. 6 is an explanatory diagram of re-encoding in the encoding processing section in FIG. 4.

FIG. 5 and FIG. 6 are diagrams which describe re-encoding by the encoding processing section 31 in FIG. 4.

An encoded stream of the H.264/AVC method has a dependency relationship in a same slice in CABAC (Context-based Adaptive Binary Arithmetic Coding), Intra MB (Macro Block) Prediction, Motion Vector Prediction, etc. Also, the encoding is performed from the top for each horizontal line, and from the left in each horizontal line.

Accordingly, for example, as illustrated in FIG. 5, when an encoded stream of a multi-image playback image is generated, which includes image contents A to D disposed at upper left, at upper right, at lower left, and at lower right on a screen, respectively, using encoded streams of four image contents A to D having one screen as one slice individually in the H.264/AVC method, if the encoded stream of the image contents A to D are simply combined to generate the encoded stream of the multi-image playback image, a multi-image playback image after decoding is different from the original image contents A to D.

Specifically, a macro block a2 located at the leftmost in the second horizontal line from the top of the image contents A is encoded with reference to a macro block a1 located at the rightmost in the first horizontal line from the top of the image contents A, which has been encoded before the macro block a2 in the same slice in the original image contents A, etc.

However, when the encoded stream of the multi-image playback image is decoded, the macro block a2 is decoded with reference to a macro block b located at the rightmost in the first line from the top of the image contents B, which has been encoded before the macro block a2 in the same slice, etc. Accordingly, the macro block referenced at the time of encoding the macro block a2 is different from the macro block referenced at the time of decoding the macro block a2, and thus the image contents A in the multi-image playback image and the macro block a2 of the original image content A have different byte strings.

And a macro block to be decoded subsequently to the macro block a2 is decoded with reference to the macro block a2, or a macro block, which has referenced the macro block a2. Accordingly, a byte string of a macro block that is decoded after the macro block a2 in the image contents A and B in the multi-image playback image is different from that of the original image contents A and B. This is the same for the case of the image contents C and D.

Also, the encoded stream of the multi-image playback image sometimes does not conform to the HRD (Hypothetical Reference Decoder) standard, which is the AVC standard.

Thus, as illustrated in FIG. 6, the encoding processing section 31 performs re-encoding on macro blocks arranged in the horizontal direction for each of the image contents A to D as a same slice. Thereby, in each of the image contents, dependency relationships are lost among macro blocks having different positions in the vertical direction. Accordingly, by combining image encoded streams of the contents A to D, even if encoding order of macro blocks is different, a multi-image playback image after the decoding becomes the same as the original image contents A to D.

Specifically, the macro block a2 of the image contents A is a beginning macro block of a slice, the original image contents A is encoded without referencing the other macro blocks. Also, at the time of decoding the encoded stream of the multi-image playback image, the macro block a2 is a beginning macro block of a slice, and thus the macro block a2 is decoded without referencing the other macro blocks. Accordingly, the other macro blocks are not referenced both at the time of encoding and decoding the macro block a2, and thus the macro block a2 has the same byte string both in the image contents A in the multi-image playback image and in the original image contents A.

Also, a macro block a2', which is encoded and decoded next to the macro block a2, is encoded by with reference to the macro block a2, which has been decoded before in the same slice. And at the time of decoding the encoded stream of the multi-image playback image, the macro block a2' is encoded with reference to the macro block a2, which has been decoded before in the same slice. Accordingly, the macro block a2' has the same byte string both in the image contents A in the multi-image playback image and in the original image contents A. This is the same for the macro blocks subsequent to the macro block a2'.

Also, the encoding processing section 31 determines picture types of the encoded streams of the individual image contents that are played back at the same time to be the same, and thus a slice type of the multi-image playback image conforms to the H.264/AVC method.

Example of Configuration of Stream Combination Section

Figure 7:
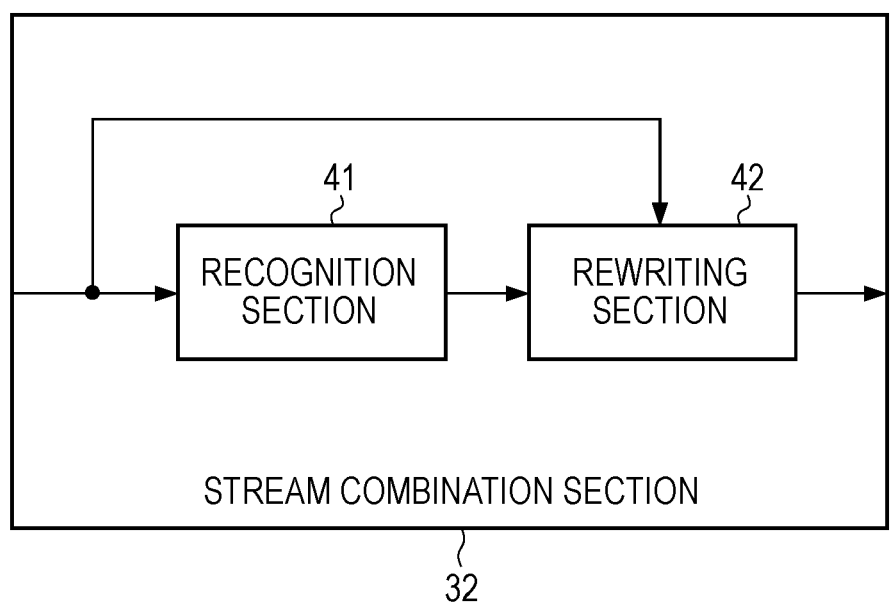
FIG. 7 is a block diagram illustrating an example of a configuration of the stream combination section in FIG. 4.

FIG. 7 is a block diagram illustrating an example of a configuration of the stream combination section in FIG. 4.

As illustrated in FIG. 7, the stream combination section 32 includes a recognition section 41 and a rewriting section 42.

The recognition section 41 recognizes a data length I of the NAL (Network Abstraction Layer) unit of a slice and the number of macro blocks sx of the slice from the encoded stream of the plurality of image contents supplied from the encoding processing section 31 in FIG. 4, and supplies the data length I and the number of macro blocks sx to the rewriting section 42.

The rewriting section 42 rewrites slice headers of the encoded streams of the plurality of image contents supplied from the encoding processing section 31 on the basis of the data length I and the number of macro blocks sx, which are supplied from the recognition section 41, and disposition of the plurality of image contents in the multi-image playback image.

Also, the rewriting section 42 obtains a lossless coding method flag indicating a lossless coding method from the NAL unit of the PPS (Picture Parameter Set) included in the individual encoded stream of the plurality of image contents supplied from the encoding processing section 31. Here, as a lossless coding method, CAVLC (Context-Adaptive Variable Length Coding) or CABAC (Context-Adaptive Binary Arithmetic Coding) is provided. And the lossless coding method flag is 1 when the flag indicates CABAC, whereas the lossless coding method flag is 0, when the flag indicates CAVLC.

The rewriting section 42 performs predetermined processing on slice data of the individual encoded streams of the plurality of image contents whose slice headers have been rewritten on the basis of the lossless coding method flag. And the rewriting section 42 combines the encoded streams of the image contents including the slice data having been subjected to the predetermined processing and the slice header after the rewriting on the basis of the disposition of the plurality of image contents in the multi-image playback image so as to generate an encoded stream of the multi-image playback image, and supplies the encoded stream to the transmission section 33 (FIG. 4).

Example of Configuration of Encoded Stream

Figure 8:
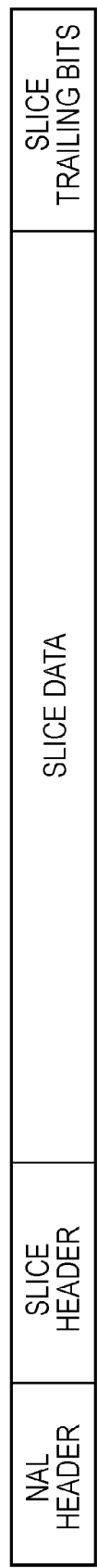
FIG. 8 is a block diagram illustrating an example of a configuration of an NAL unit of a slice.

FIG. 8 is a block diagram illustrating an example of a configuration of an NAL unit included in a slice.

As illustrated in FIG. 8, in an NAL unit of a slice, an NAL header, a slice header, slice data, and slice trailing bits are disposed in sequence from the beginning.

The NAL header includes information indicating that data included in the NAL unit is encoded data for each slice, etc. The slice header includes information on the encoded data of the slice, etc. The slice data is encoded data for each slice. The slice trailing bits is information indicating an end of the encoded data for each slice.

Figure 9:
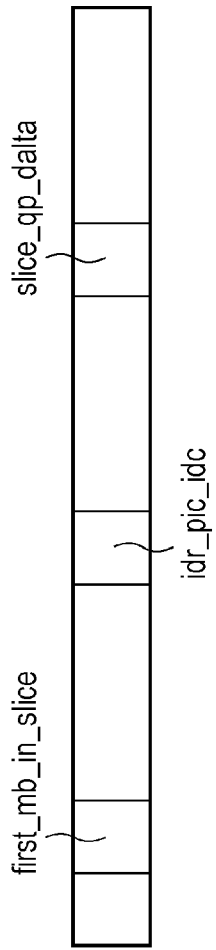
FIG. 9 is a block diagram illustrating an example of a configuration of a slice header.

FIG. 9 is a block diagram illustrating an example of a configuration of the slice header.

As illustrated in FIG. 9, the slice header includes beginning macro block information (first_mb_in_slice), which specifies an address of a beginning macro block in a slice, IDR picture information (idr_pic_idc), which is an identifier of the IDR picture, quantization parameter information (slice_qp_delta), which specifies a quantization parameter for a luminance signal that is set until specified by the macro block, etc. In this regard, the IDR picture information is included only in a slice header of an IDR picture.

When the stream combination section 32 combines encoded streams of image contents to generates an encoded stream of a multi-image playback image, as illustrated in FIG. 6, an encoding order of the original image contents and that of the image contents of the multi-image playback image are different. Accordingly, the stream combination section 32 rewrites the macro block information in the slice header.

Also, it is necessary that IDR picture information included in the slice header of the same IDR picture is the same, and thus the stream combination section 32 rewrites the IDR picture information included in the slice header of each of the image contents included in the IDR picture of the multi-image playback image.

Further, as illustrated by the following expression (1), an initial value SliceQPY of a quantization parameter (QP) of each slice depends not only on the quantization parameter, but also pic_init_qp_minus26 included in the PPS.
SliceQPY=26+pic_init_qp_minus26+slice_qp_delta . . . (1)

Accordingly, the stream combination section 32 increases the quantization parameter in the slice header by a value produced by subtracting pic_init_qp_minus26 included in the PPS of the multi-image playback image from pic_init_qp_minus26 included in the PPS of each of the image contents. Thereby, the stream combination section 32 makes the initial value SliceQPY of the quantization parameter (QP) of each slice identical between the original image contents and the multi-image playback image. In this regard, as the PPS of the multi-image playback image, for example, any of the PPSs of the individual image contents is used.

Description of Processing by Stream Combination Section

Figure 10:
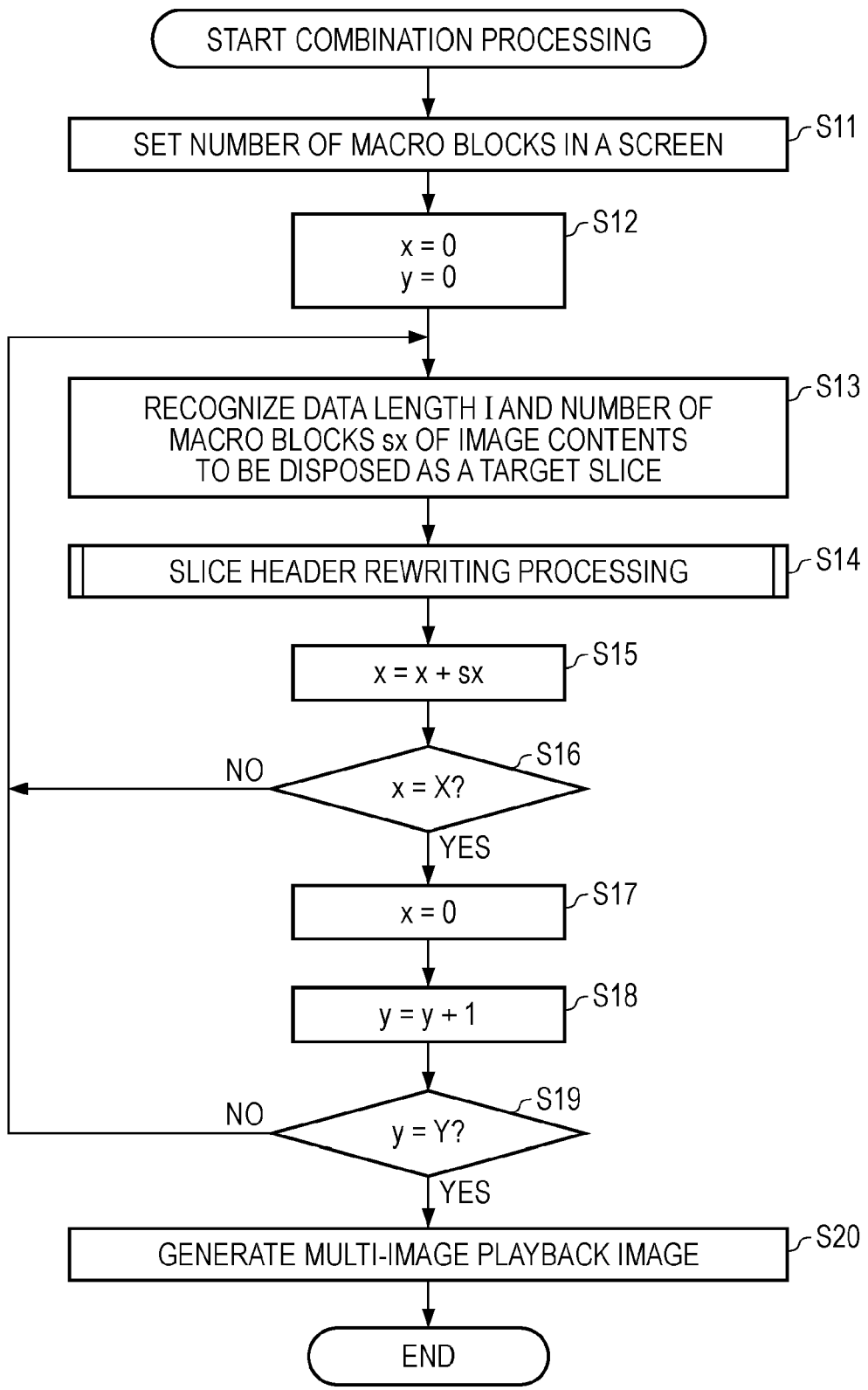
FIG. 10 is a flowchart illustrating combination processing of the stream combination section in FIG. 7.

FIG. 10 is a flowchart illustrating the combination processing of the stream combination section 32 in FIG. 7.

In step S11 in FIG. 10, the stream combination section 32 sets the number of macro blocks X in the horizontal direction and the number of macro blocks Y in the vertical direction in the screen of the multi-image playback image. In step S12, the stream combination section 32 sets a macro block number x in the horizontal direction and a macro block number y in the vertical direction of the beginning macro block of a slice (hereinafter referred to as a target slice) to be processed in the multi-image playback image to 0.

In this regard, the macro block number x in the horizontal direction is a number assigned to a macro block included in the multi-image playback image from the left to the right in sequence. The macro block number y in the vertical direction is a number assigned to a macro block included in the multi-image playback image from the top to the bottom in sequence.

In step S13, the recognition section 41 recognizes the data length I and the number of macro blocks sx of the slice of the image contents disposed as a target slice from the encoded stream of the plurality of image contents supplied from the encoding processing section 31 on the basis of the disposition of the plurality of image contents in the multi-image playback image. And the recognition section 41 supplies the data length I and the number of macro blocks sx to the rewriting section 42.

In step S14, the stream combination section 32 performs slice header rewriting processing which rewrites the slice header of the slice of the image contents disposed as the target slice. A description will be given of details on this slice header rewriting processing with reference to FIG. 11 described later.

In step S15, the stream combination section 32 increments the macro block number x by the number of macro blocks sx.

In step S16, the stream combination section 32 determines whether the macro block number x is equal to the number of macro blocks X. In step S16, if determined that the macro block number x is not equal to the number of macro blocks X, the processing returns to step S13, and the processing from step S13 to S16 is repeated until the macro block number x becomes equal to the number of macro blocks X.

On the other hand, in step S16, if determined that the macro block number x is equal to the number of macro blocks X, in step S17, the stream combination section 32 sets the macro block number x to 0. In step S18, the stream combination section 32 increments the macro block number y by 1.

In step S19, the stream combination section 32 determines whether the macro block number y is equal to the number of macro blocks Y. In step S19, if determined that the macro block number y is not equal to the number of macro blocks Y, the processing returns to step S13, and the processing from step S13 to S19 is repeated until the macro block number y becomes the number of macro blocks Y.

On the other hand, in step S19, if determined that the macro block number y is equal to the number of macro blocks Y, the processing proceeds step S20. In step S20, the rewriting section 42 combines the encoded streams of the image contents after the slice header rewriting processing in order of processing so as to generate an encoded stream of the multi-image playback image, and supplies the encoded stream to the transmission section 33 (FIG. 4).

FIG. 11 is a flowchart illustrating details of the slice header rewriting processing of step S14 in FIG. 10.

In step S41 in FIG. 11, the rewriting section 42 determines the beginning macro block information of the slice of the image contents disposed as the target slice, the IDR picture information, and the quantization parameter information. Specifically, the rewriting section 42 determines, for example, information specifying an address of the macro block of the image contents disposed as the beginning macro block of the target slice to be the beginning macro block information.

In step S42, the rewriting section 42 rewrites the beginning macro block information included in the slice header of the slice of the image contents disposed as a target slice to the beginning macro block information determined in step S41.

In step S43, the rewriting section 42 determines whether an NAL unit type (nal_unit_type) included in the NAL header of the slice of the image contents disposed as a target slice is 5.

In step S43, if determined that the NAL unit type is 5, in step S44, the rewriting section 42 rewrites the IDR picture information included in the slice header of the slice of the image contents disposed as the target slice to the IDR picture information determined by step S41. And the processing proceeds to step S45.

In step S43, if determined that the NAL unit type is not 5, the processing in step S44 is skipped, and the processing proceeds to step S45.

In step S45, the rewriting section 42 rewrites the quantization parameter information included in the slice header of the slice of the image contents disposed as the target slice to the quantization parameter information determined in step S41.

In step S46, a determination is made of whether the lossless coding method flag (entropy_coding_mode_flag) is 1. In step S46, if determined that the lossless coding method flag is 1, in step S47, the rewriting section 42 performs slice data processing of CABAC. A description will be given of details of the slice data processing of CABAC with reference to FIG. 12 described later.

On the other hand, if determined that the lossless coding method flag is 0 in step S46, in step S48, the rewriting section 42 performs slice data processing of CAVLC. A description will be given of details of the slice data processing of CAVLC with reference to FIG. 13 described later.

After the processing of step S47 or step S48, the processing returns to step S14 in FIG. 10, and the processing proceeds to step S15.

FIG. 12 is a flowchart illustrating details of the slice data processing of CABAC in step S47 in FIG. 11.

In step S61 in FIG. 12, the rewriting section 42 rewrites the number of cabac_alignment_one_bit for byte alignment of the slice data on the basis of the amount of data (amount of bits) of the slice header after rewriting. Specifically, the rewriting section 42 determines a value produced by subtracting the remainder when the amount of data of the slice header is divided by 8 is subtracted from 8 to a new number of cabac_alignment_one_bit.

In this regard, the amount of data of the slice header after the rewriting is the difference between the data length I supplied from the recognition section 41 and the data length I' of the NAL unit of the slice after rewriting the slice header.

After the processing of step S61, the processing returns to step S47 in FIG. 11, the processing returns to step S14 in FIG. 10, and the processing proceeds to step S15.

FIG. 13 is a flowchart illustrating details of the slice data processing of CAVLC in step S48 in FIG. 11.

In step S81 in FIG. 13, the rewriting section 42 determines the amount of shifting bits of the slice data on the basis of the amount of data of the slice header after rewriting. Specifically, the rewriting section 42 determines the value produced by subtracting the remainder when the amount of data of the slice header is divided by 8 is subtracted from 8 to be the amount of shifting bits of the slice data.

In step S82, the rewriting section 42 shifts each byte data of the slice data by the amount of shifting bits determined in step S81.

In step S83, the rewriting section 42 rewrites the number of rbsp_slice_trailing_bits on the basis of the amount of data of the slice header after the rewriting. In step S84, the rewriting section 42 performs the processing of emulation_prevention_three_byte. And the processing returns to step S48 in FIG. 11, returns to step S14 in FIG. 10, and the processing proceeds to step S15.

As described above, the stream combination section 32 generates an encoded stream of the multi-image playback image using the encoded stream produced by encoding the macro blocks arranged in the horizontal direction as a same slice for each of the plurality of image contents. Accordingly, only by combining encoded streams of the plurality of image contents, it is possible to generate an encoded stream of the multi-image playback image.

Accordingly, compared with a related-art technique in which an encoded stream of image contents is decoded, and then re-encoded to generate the encoded stream of the multi-image playback image, it is possible to reduce processing load at the time of generating a multi-image playback image. Also, decoding and re-encoding are not performed as the related-art technique, and thus it is possible to prevent deterioration of image quality.

In this regard, hereinafter, in order to distinguish from the related-art method, a method of generating an encoded stream of a multi-image playback image by the stream combination section 32 is referred to as a direct copy method.

Second Embodiment

Example of Configuration of Content Distribution Server According to Second Embodiment FIG. 14 is a block diagram illustrating an example of a configuration of the content distribution server 11 in a multi-image playback system, to which the present technique is applied, according to a second embodiment.

Among the configuration illustrated in FIG. 14, a same reference symbol is given to a same configuration as that in FIG. 4. A duplicated description will be suitably omitted.

The configuration of the content distribution server 11 in FIG. 14 is different from the configuration in FIG. 4 in the point that a control section 51, a selection section 52, a parameter transcode processing section 53, and a combination section 54 are newly disposed. The content distribution server 11 in FIG. 14 generates an encoded stream of a multi-image playback image using selectively the direct copy method or a parameter transcode method (the details will be described later) on the basis of the permissible amount of processing by the own processor (hereinafter referred to as a permissible amount of processing).

Specifically, the control section 51 of the content distribution server 11 calculates the number of transcodes np and the number of direct copies nq on the basis of a permissible amount of processing SL, an amount of transcode processing R, an amount of direct copy processing Q, and the number of connected clients N, which is the number of content receiving apparatuses 13, etc.

In this regard, the amount of transcode processing R is an assumed amount of processing per unit area when generating an encoded stream of a multi-image playback image using the parameter transcode method. The amount of direct copy processing Q is an assumed amount of processing per unit area when generating an encoded stream of a multi-image playback image using the direct copy method. Also, the number of transcodes np is the number of the encoded streams of the image contents using the parameter transcode method, and the number of direct copies nq is the number of the encoded streams of the image contents using the direct copy method.

The control section 51 determines the encoded stream of nq (the number of direct copies) image contents (hereinafter referred to as a direct copy stream) among the encoded streams of the plurality of image contents that are output from the encoding processing section 31 on the basis of the number of direct copies nq. Also, the control section 51 determines the encoded streams of np (the number of transcodes) image contents (hereinafter referred to as a transcode stream) among the encoded streams of the plurality of image contents that are output from the encoding processing section 31 on the basis of the number of transcodes np.

And the control section 51 controls the selection section 52 so as to supply the direct copy streams output from the encoding processing section 31 to the stream combination section 32, and to supply the transcode stream to the parameter transcode processing section 53.

The selection section 52 supplies the direct copy stream among the encoded streams supplied from the encoding processing section 31 to the stream combination section 32 under the control of the control section 51 so as to cause the stream combination section 32 to generate a part of the encoded streams of the multi-image playback image. Also, the selection section 52 supplies the transcode streams to the parameter transcode processing section 53 under the control of the control section 51 so as to cause the parameter transcode processing section 53 to generate a part of the encoded streams of the multi-image playback image.

The parameter transcode processing section 53 generates a part of the encoded streams of the multi-image playback image from the transcode streams supplied from the selection section 52 using the parameter transcode method.

In this regard, the parameter transcode method is a method of generating an encoded stream of a multi-image playback image by parameter transcode in which the encoded streams of image contents are decoded, and re-encoding is performed directly using the encoding parameters included in the encoded stream. The encoding parameters include, for example, type information (an intra type and an inter type) of a macro block, size information of a predicted block, motion vector information, an intra prediction mode, etc.

In the parameter transcode method, re-encoding is performed, and thus it is possible to reduce the amount of coding by changing quantization precision. Also, in the parameter transcode method, re-encoding is performed using the encoding parameters, and thus processing load is smaller than that of the related-art methods, but decoding and re-encoding using the encoding parameters are performed, and thus processing load is large compared with that of the direct copy method.

For example, if it is assumed that the amount of processing by a related-art method is 1, in a certain experiment, the amount of processing by the direct copy method was $1/75$, whereas the amount of processing by the parameter transcode method was $1/2$. In this regard, the amount of processing depends on a processor performance on which the processing is performed, and a memory access speed.

The parameter transcode processing section 53 combines the part of the encoded stream obtained as a result of the parameter transcode on the basis of disposition of the image contents in the multi-image playback image, and supplies the encoded stream to the combination section 54.

The combination section 54 combines the part of the encoded stream of the multi-image playback image outputted from the stream combination section 32, and the part of the encoded stream of the multi-image playback image supplied from the parameter transcode processing section 53. The combination section 54 supplies the encoded stream of the multi-image playback image obtained as a result to the transmission section 33.

Description of Overview of Content Distribution Server Processing

FIG. 15 is an explanatory diagram of an overview of processing in the content distribution server 11 in FIG. 14.

In the example in FIG. 15, a multi-image playback image is constituted by nine image contents A to I.

As illustrated in FIG. 15, the control section 51 controls the selection section 52 to supply the direct copy streams of the number of direct copies nq, among the encoded streams of the image contents A to I, to the stream combination section 32. Also, the control section 51 controls the selection section 52 to supply the transcode streams of the number of transcodes np, among the encoded streams of the image contents A to I, to the parameter transcode processing section 53.

In the example in FIG. 15, the number of direct copies nq is 6, and the number of transcodes np is 3. Accordingly, encoded streams of six image contents, image content A and image contents C to G, are supplied to the stream combination section 32 as direct copy streams. Also, the encoded streams of three image contents, image content B, image content H, and image content I, are supplied to the parameter transcode processing section 53 as transcode streams.

Example of Configuration of Parameter Transcode Processing Section

Figure 16:
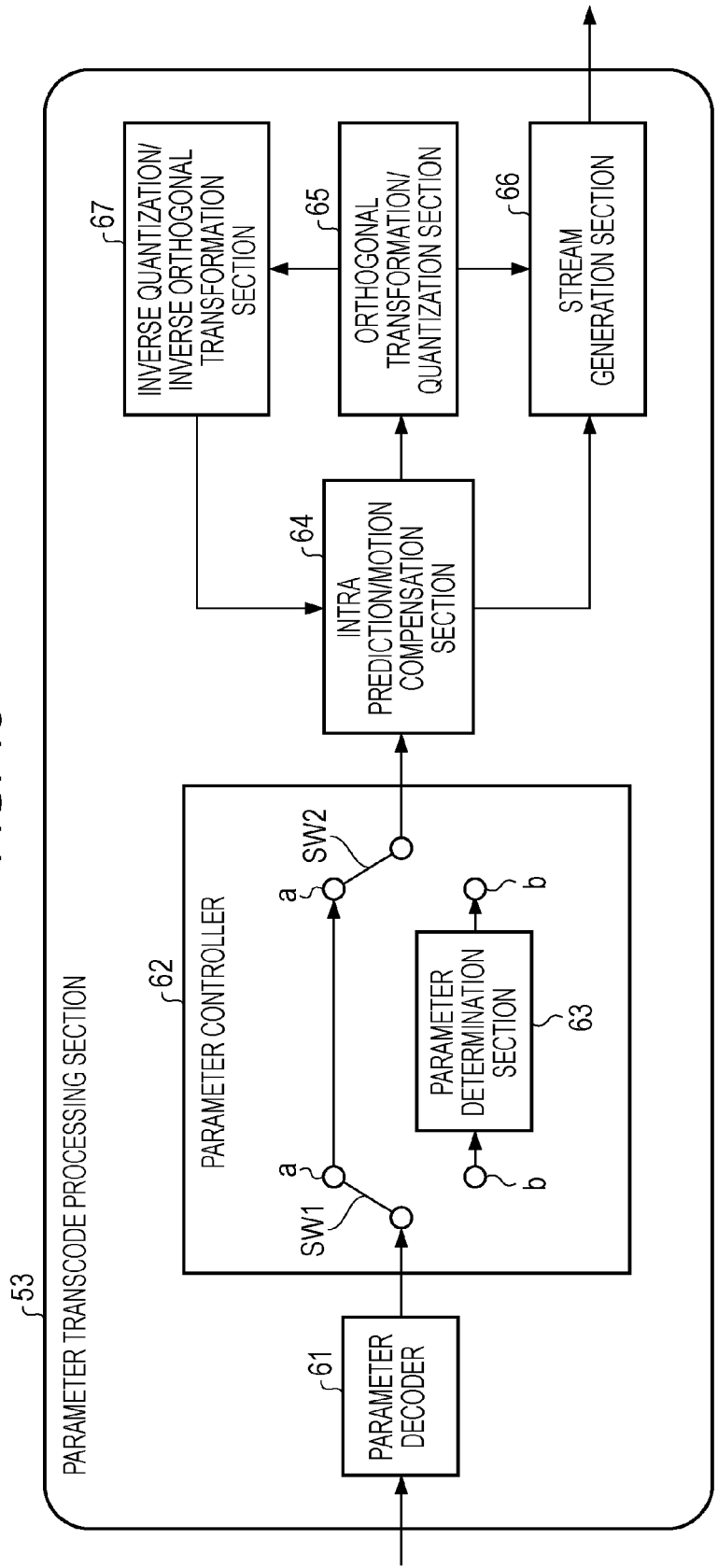
FIG. 16 is a block diagram illustrating an example of a configuration of the parameter transcode processing section in FIG. 14.

FIG. 16 is a block diagram illustrating an example of a configuration of the parameter transcode processing section 53 in FIG. 14.

As illustrated in FIG. 16, the parameter transcode processing section 53 includes a parameter decoder 61, a parameter controller 62 including a parameter determination section 63, an intra-prediction/motion compensation section 64, an orthogonal transformation/quantization section 65, a stream generation section 66, and an inverse transformation/inverse orthogonal transformation section 67.

The parameter decoder 61 decodes the transcode stream supplied from the selection section 52 in FIG. 14, and supplies the encoding parameter and the image data obtained as a result to the parameter controller 62.

The parameter controller 62 obtains the encoding parameter and the image data, determines whether encoding processing by the normal H.264/AVC method is necessary or not, and changes internal switches SW1 and SW2. More specifically, if determined that the normal encoding processing is not necessary, the parameter controller 62 causes the switches SW1 and SW2 to connect to a a-side, and directly supplies the obtained encoding parameter and image data to the subsequent-stage intra-prediction/motion compensation section 64. On the other hand, if determined that the normal encoding processing is necessary, the parameter controller 62 causes the switches SW1 and SW2 to connect to a b-side, and supplies the obtained encoding parameter and image data to the parameter determination section 63.

The parameter determination section 63 performs intra/inter type determination processing, block-size determination processing, motion vector calculation processing, and intra prediction mode determination processing in the same manner as the normal encoding processing by the H.264/AVC method, and determines encoding parameters. The determined encoding parameters and image data are supplied to the intra-prediction/motion compensation section 64.

If the type information of the macro block included in the encoding parameter indicates the intra type, the intra-prediction/motion compensation section 64 performs intra prediction on the basis of the encoding parameters. On the other hand, if the type information of the macro block included in the encoding parameter indicates the inter type, the intra-prediction/motion compensation section 64 performs motion compensation on the basis of the encoding parameter.

Also, the intra-prediction/motion compensation section 64 subtracts the image data of the predicted image obtained as a result of the intra prediction or the motion compensation from the image data supplied from the parameter controller 62, and generates the difference image data. The intra-prediction/motion compensation section 64 supplies the difference image data to the orthogonal transformation/quantization section 65.

Further, the intra-prediction/motion compensation section 64 adds the difference image data supplied from the inverse transformation/inverse orthogonal transformation section 67 and the image data of the predicted image obtained as a result of the intra prediction or the motion compensation. The intra-prediction/motion compensation section 64 refers to the image data obtained as a result at the time of the intra prediction or the motion compensation.

The orthogonal transformation/quantization section 65 performs orthogonal transformation on the difference image data supplied from the intra-prediction/motion compensation section 64 to obtain a transformation coefficient. The orthogonal transformation/quantization section 65 quantizes the obtained transformation coefficient, and supplies the quantized transformation coefficient to the stream generation section 66 and the inverse transformation/inverse orthogonal transformation section 67.

The stream generation section 66 performs CABAC or CAVLC on the quantized transformation coefficient supplied from the orthogonal transformation/quantization section 65 and the encoding parameter supplied from the intra-prediction/motion compensation section 64 as lossless coding. The stream generation section 66 combines the encoded streams obtained as a result on the basis of disposition of the image contents in the multi-image playback image, and outputs the combined encoded stream as a part of the encoded stream of the multi-image playback image.

The inverse transformation/inverse orthogonal transformation section 67 performs inverse transformation on the quantized transformation coefficient supplied from the orthogonal transformation/quantization section 65, and further performs inverse orthogonal transformation on the obtained transformation coefficient. To put it in another way, the inverse transformation/inverse orthogonal transformation section 67 performs the inverse transformation and the inverse orthogonal transformation by a method corresponding to the orthogonal transformation and quantization performed by the orthogonal transformation/quantization section 65. The inverse transformation/inverse orthogonal transformation section 67 supplies the difference image data obtained as a result of the inverse orthogonal transformation to the intra-prediction/motion compensation section 64.

Description of Processing by Control Section

Figure 17:
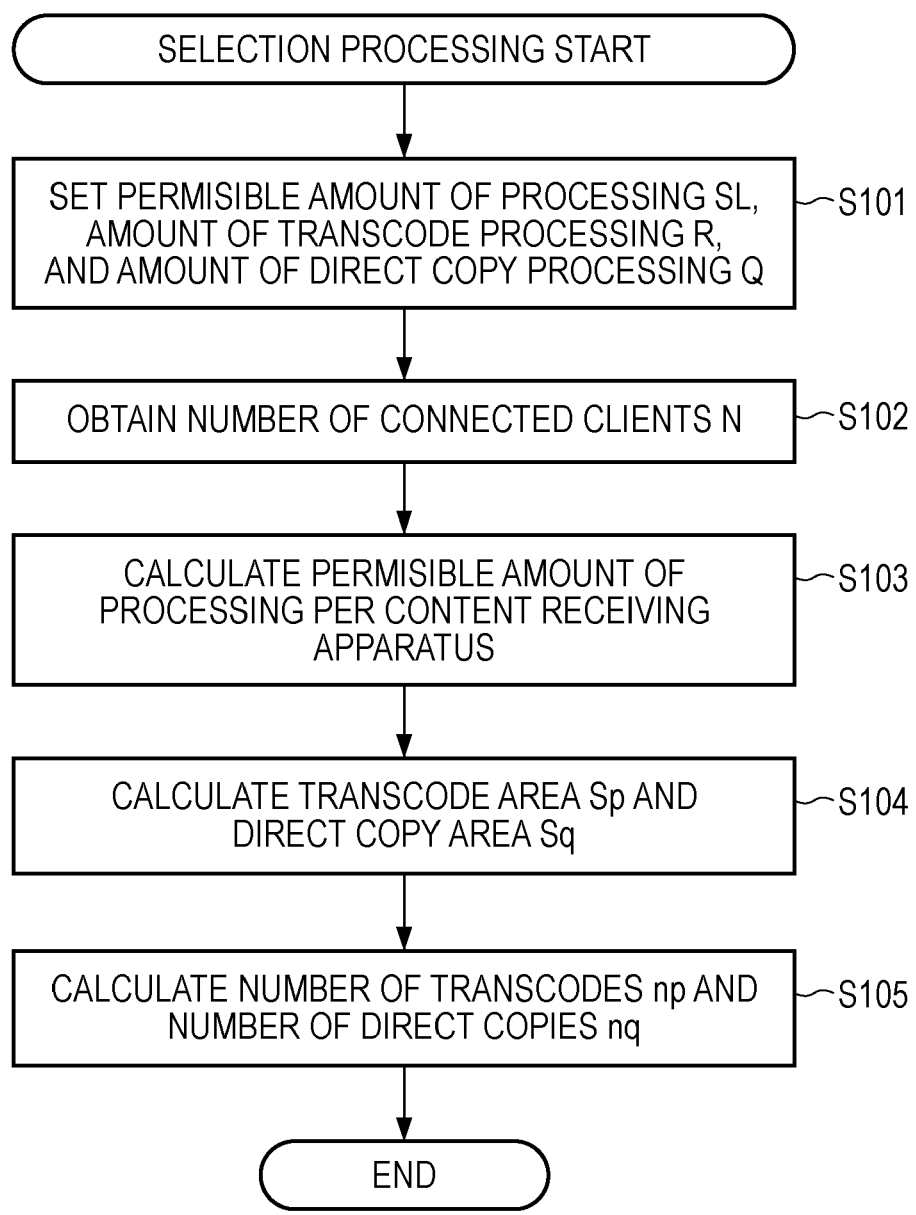
FIG. 17 is a flowchart illustrating selection processing in the control section in FIG. 14.

FIG. 17 is a flowchart illustrating selection processing by the control section 51 (FIG. 14) in the content distribution server 11.

In step S101 in FIG. 17, the control section 51 sets a permissible amount of processing SL, an amount of transcode processing R, and an amount of direct copy processing Q. In step S102, the control section 51 performs communication with the content receiving apparatus 13, etc., to obtain the number of connected clients N.

In step S103, the control section 51 divides the permissible amount of processing SL by the number of connected clients N, and determines the quotient value obtained as a result to be a permissible amount of processing per each content receiving apparatus 13.

In step S104, the control section 51 calculates a transcode area Sp and a direct copy area Sq on the basis of the permissible amount of processing per each content receiving apparatus 13, a screen area of the multi-image playback image, the amount of transcode processing R, and the amount of direct copy processing Q. Specifically, the control section 51 calculates the transcode area Sp and the direct copy area Sq such that the sum of the product value of the transcode area Sp and the amount of transcode processing R, and the product value of the direct copy area Sq and the amount of direct copy processing Q becomes a maximum value which is not greater than the permissible amount of processing per each content receiving apparatus 13.

In this regard, the transcode area Sp is an area of image contents of a transcode stream in a multi-image playback image, and the direct copy area Sq is an area of image contents of a direct copy stream of a multi-image playback image.

In step S105, the control section 51 calculates the number of transcodes np and the number of direct copies nq on the basis of an area per image content, a transcode area Sp, and a direct copy area Sq in the multi-image playback image. In this regard, here, it is assumed that areas of the individual image contents in the multi-image playback image are all the same, but there may be a plurality of kinds of the areas. In this case, the number of transcodes np and the number of direct copies nq are calculated for each kind of the area.

The control section 51 determines the transcode stream and the direct copy stream on the basis of the number of transcodes np and the number of direct copies nq, which have been calculated as described above. And the control section 51 controls the selection section 52 to supply the direct copy stream to the stream combination section 32, and to supply the transcode stream to the parameter transcode processing section 53.

As described above, the content distribution server 11 in FIG. 14 causes the stream combination section 32 and the parameter transcode processing section 53 to generate an encoded stream of a multi-image playback image on the basis of the permissible amount of processing SL. Accordingly, it is possible for the content distribution server 11 in FIG. 14 to generate an encoded stream of a multi-image playback image by the amount of processing that is within the permissible amount of processing SL while suppressing the bit rate.

That is to say, as described above, in the parameter transcode method, it is possible to reduce the amount of coding by changing quantization precision, but the amount of processing is larger compared with the direct copy method. Accordingly, the content distribution server 11 in FIG. 14 calculates the transcode area Sp and the direct copy area Sq such that the amount of processing becomes the maximum value that is not greater than the permissible amount of processing SL to increase the transcode area Sp within a range in which the amount of processing does not exceed the permissible amount of processing SL, thereby making it possible to suppress the bit rate.

Also, the content distribution server 11 in FIG. 14 calculates the number of transcodes np and the number of direct copies nq on the basis of the number of connected clients N, and thus it is possible to set optimum number of transcodes np and the number of direct copies nq in accordance with a change in the number of connected clients N.

In this regard, the number of transcodes np and the number of direct copies nq may be different for each content receiving apparatus 13. In this case, the permissible amount of processing for the content receiving apparatus 13 is calculated for each application, etc., in the content receiving apparatus 13, in which the multi-image playback image is used, and the number of transcodes np and the number of direct copies nq are calculated.

Third Embodiment

Figure 18:
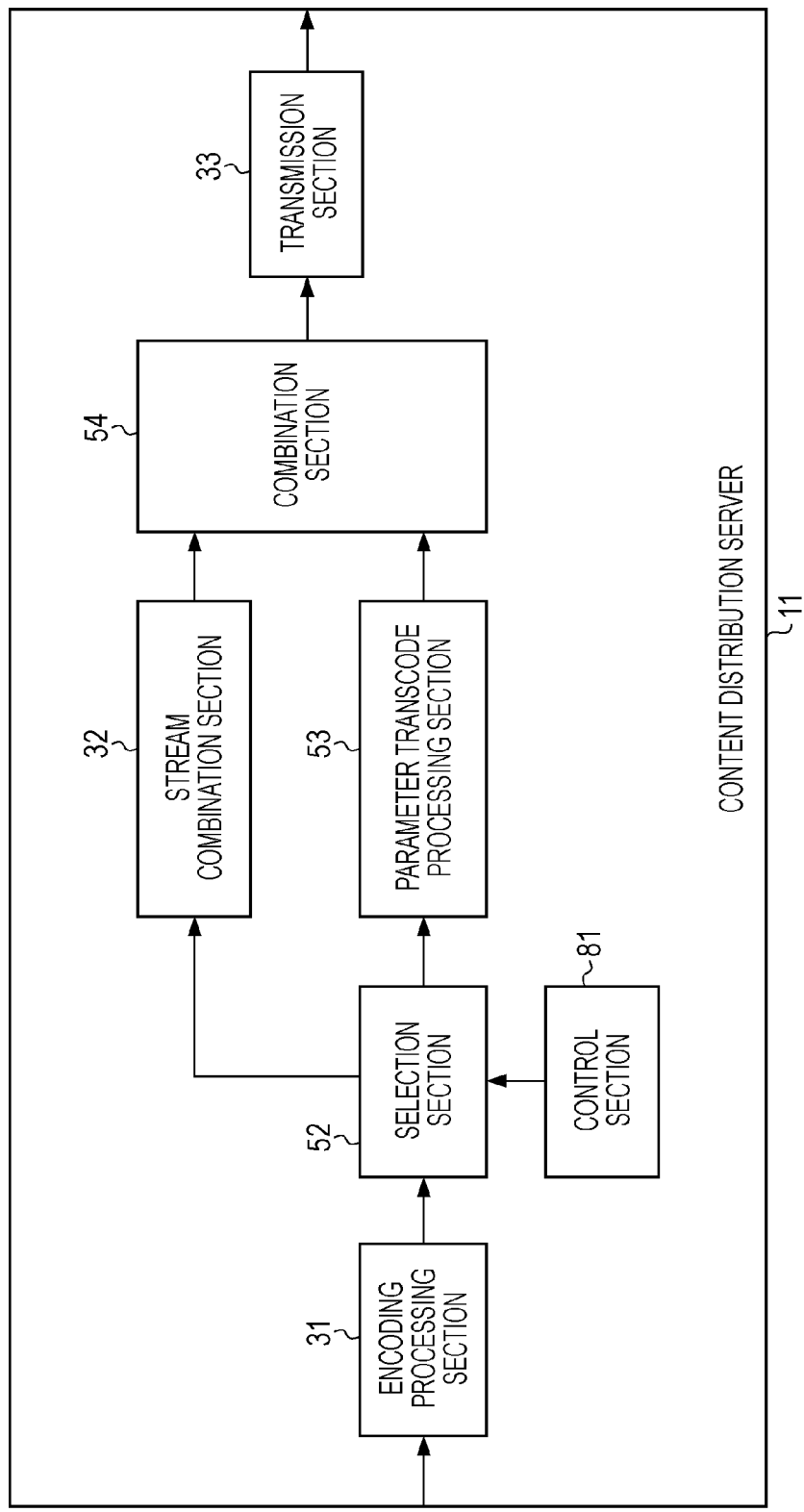
FIG. 18 is a block diagram illustrating an example of a configuration of a content distribution server in a multi-image playback system, to which the present technique is applied, according to a third embodiment.

Example of Configuration of Content Distribution Server According to Third Embodiment FIG. 18 is a block diagram illustrating an example of a configuration of the content distribution server 11 in a multi-image playback system, to which the present technique is applied, according to a third embodiment.

Among the configuration illustrated in FIG. 18, a same reference symbol is given to a same configuration as that in FIG. 14. A duplicated description will be suitably omitted.

The configuration of the content distribution server 11 in FIG. 18 is different from the configuration in FIG. 14 in the point that a control section 81 is disposed in place of the control section 51. The content distribution server 11 in FIG. 18 generates an encoded stream of a multi-image playback image selectively using the direct copy method and the parameter transcode method not on the basis of the permissible amount of processing, but on the basis of the bit rate (hereinafter referred to as a specified rate) TR specified by a user.

Specifically, the control section 81 of the content distribution server 11 calculates the number of transcodes np and the number of direct copies nq on the basis of a specified rate TR. The control section 81 determines a direct copy stream among the encoded streams of the plurality of image contents outputted from the encoding processing section 31 on the basis of the number of direct copies nq in the same manner as the control section 51 in FIG. 14. Also, the control section 81 determines a transcode stream among the encoded streams of the plurality of image contents outputted from the encoding processing section 31 on the basis of the number of transcodes np in the same manner as the control section 51.

And, in the same manner as the control section 51, the control section 81 controls the selection section 52 so as to supply the direct copy stream outputted from the encoding processing section 31 to the stream combination section 32, and to supply the transcode stream to the parameter transcode processing section 53.

Description of Processing by Control Section

Figure 19:
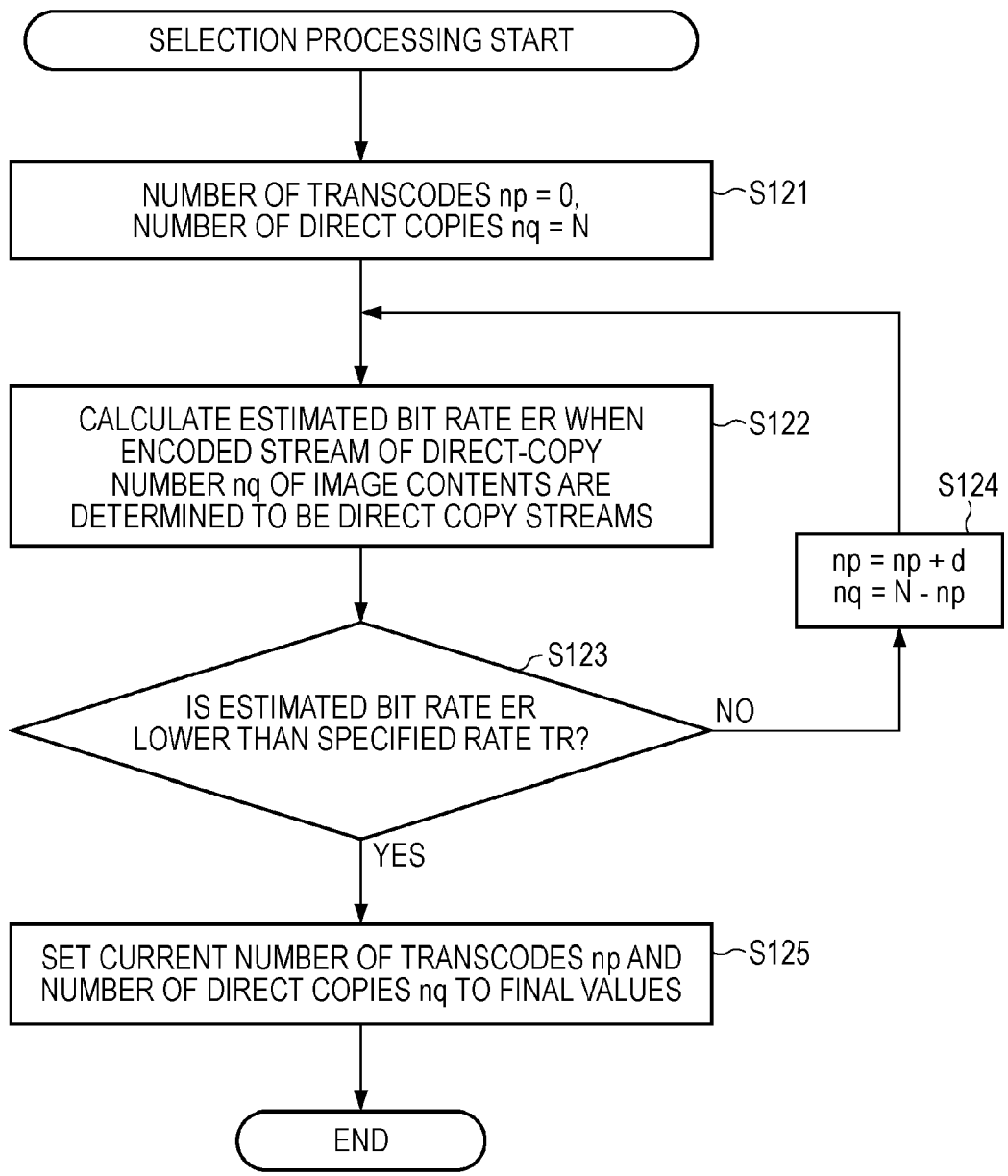
FIG. 19 is a flowchart illustrating selection processing in the control section in FIG. 18.

FIG. 19 is a flowchart illustrating selection processing by the control section 81 (FIG. 18) in the content distribution server 11.

In step S121 in FIG. 18, the control section 81 sets the number of transcodes np to 0. Also, the control section 81 sets the number of direct copies nq to the number of image contents N included in the multi-image playback image.

In step S122, the control section 81 calculates an estimated bit rate ER of the encoded stream of the multi-image playback image when the encoded stream of nq (the number of direct copies) image contents is determined to be a direct copy stream.

Specifically, the control section 81 controls the selection section 52 to supply the encoded stream of nq (the number of direct copies) image contents to the stream combination section 32 as a direct copy stream, and supplies the encoded stream of np (the number of transcodes) image contents to the parameter transcode processing section 53 as a transcode stream. At this time, the parameter transcode processing section 53 sets quantization precision at the time of parameter transcode to a permissible minimum quantization precision specified in advance. And the control section 81 detects a bit rate of the encoded stream of the multi-image playback image outputted from the combination section 54 as a result, and determines the bit rate to be the estimated bit rate ER.

Alternatively, the control section 81 assumes that on the basis of the data length I of the encoded stream of the image contents, etc., quantization precision at the time of parameter transcode is a permissible minimum quantization precision specified in advance, and estimates a bit rate of the encoded stream of the multi-image playback image to be the estimated bit rate ER.

In step S123, the control section 81 determines whether the estimated bit rate ER is less than the specified rate TR. In step S123, if determined that the estimated bit rate ER is not less than the specified rate TR, the processing proceeds to step S124.

In step S124, the control section 81 increments the number of transcodes np by an adjustment value d. In this regard, the larger value is set to the adjustment value d as the difference between the estimated bit rate ER and the specified rate TR increases. Also, the control section 81 determines the difference when the number of transcodes np after the increment is subtracted from the number of image contents N included in the multi-image playback image to be the number of direct copies nq. And the processing returns to step S122, and the processing from step S122 to S124 is repeated until the estimated bit rate ER becomes smaller than the specified rate TR.

In step S123, if determined that the estimated bit rate ER is less than the specified rate TR, in step S125, the control section 81 determines the current number of transcodes np and the current number of direct copies nq to be final values.

The control section 81 determines a transcode stream and a direct copy stream on the basis of the number of transcodes np and the number of direct copies nq, which have been calculated as described above. And the control section 81 controls the selection section 52 to supply the direct copy stream to the stream combination section 32, and to supply the transcode stream to the parameter transcode processing section 53.

As described above, the content distribution server 11 in FIG. 18 causes the stream combination section 32 and the parameter transcode processing section 53 to generate an encoded stream of a multi-image playback image on the basis of the specified rate TR. Accordingly, it is possible for the content distribution server 11 in FIG. 18 to generate an encoded stream of a multi-image playback image having a bit rate smaller than the specified rate TR while reducing the processing load.

That is to say, as described above, in the parameter transcode method, the amount of processing is larger than that in the case of the direct copy method, but it is possible to reduce the amount of coding by changing quantization precision. Accordingly, if the bit rate becomes the specified rate TR or more by reducing the processing load using the direct copy method for the encoded streams of all the image contents, the content distribution server 11 in FIG. 18 uses the parameter transcode method for the encoded streams of a part of image contents so as to make the bit rate smaller than the specified rate TR.

In this regard, in the case that the number of direct copies nq is N, if the estimated bit rate ER is smaller than the specified rate TR, the content distribution server 11 in FIG. 18 adds filler data to the encoded stream of the multi-image playback image, and outputs the encoded stream.

Also, in the content distribution server 11 in FIG. 18, quantization precision is set to a minimum permissible quantization precision specified in advance at the time of parameter transcoding, and thus image quality of the encoded stream of the image contents to which the parameter transcode method is used is deteriorated. Accordingly, positions and contents of the image contents in the multi-image playback image, to which the parameter transcode method is used, gives a great impact on subjective impression of the multi-image playback image.

Thus, in the content distribution server 11 in FIG. 18, a degree of importance is set to each of the image contents, and the direct copy method is assigned in descending order of degree of importance, so that it is possible to improve subjective impression of the multi-image playback image.

The methods of setting a degree of importance include a method of assigning a high degree of importance to image contents disposed in an area to which users are paying attention or a central area in the multi-image playback image, a method of assigning a high degree of importance to image contents having high popularity among users in the past, such as having a large number of viewers, etc., and a method of assigning a high degree of importance to complicated image contents, etc.

Also, it is possible to combine the second embodiment and the third embodiment. That is to say, the content distribution server 11 may calculate the number of transcodes np and the number of direct copies nq on the basis of both the permissible amount of processing SL and the specified rate TR. In this case, the permissible amount of processing SL is small, and thus there is a possibility that the bit rate of the encoded stream of the multi-image playback image does not become smaller than the specified rate TR. At this time, the content distribution server 11 determines, for example, a part of the macro blocks of the encoded stream of the multi-image playback image to be skip macro blocks so as to make the bit rate lower than the specified rate TR.

Fourth Embodiment

Figure 20:
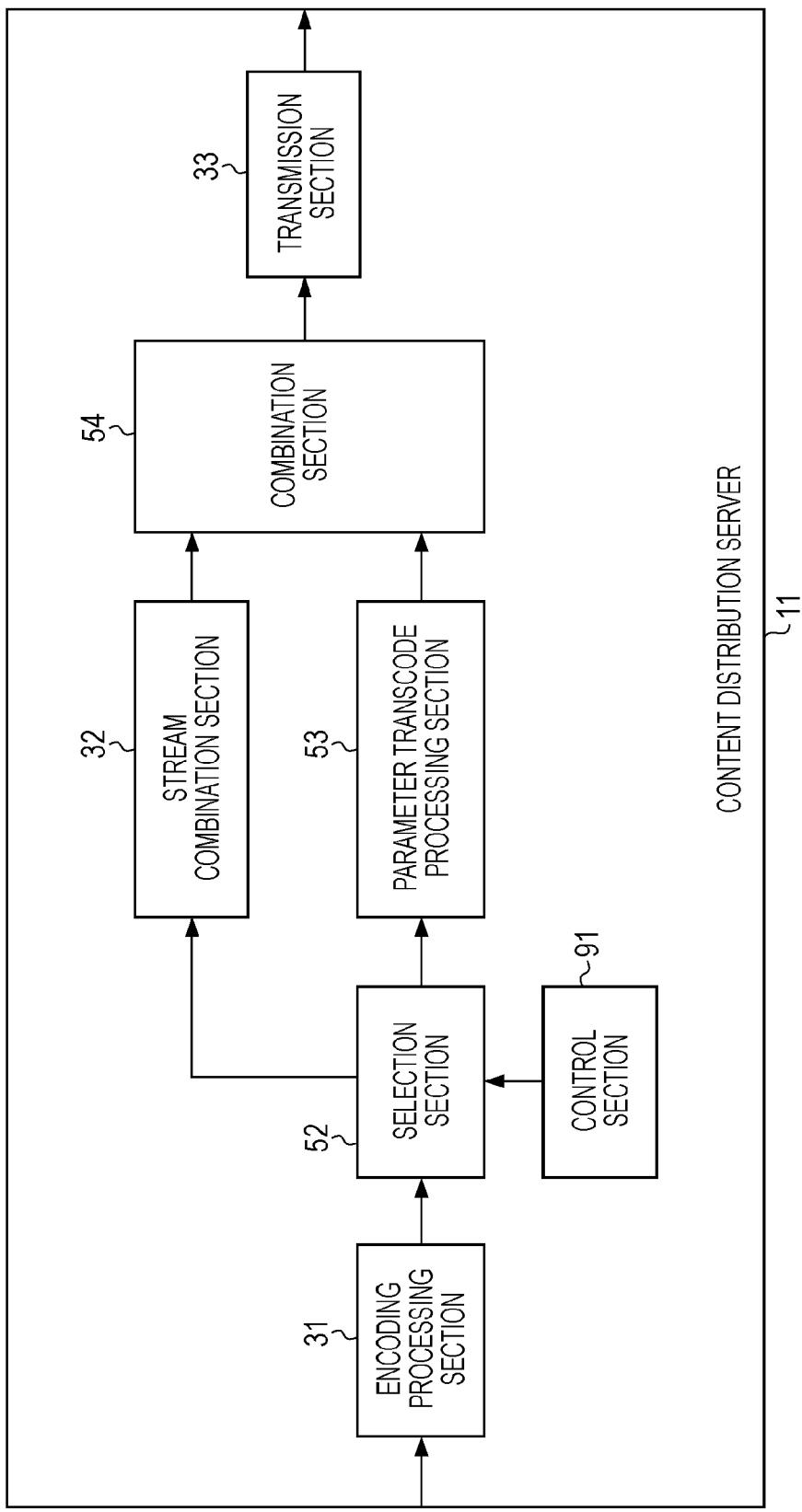
FIG. 20 is a block diagram illustrating an example of a configuration of a content distribution server in a multi-image playback system, to which the present technique is applied, according to a fourth embodiment.

Example of Configuration of Content Distribution Server According to Fourth Embodiment FIG. 20 is a block diagram illustrating an example of a configuration of the content distribution server 11 in a multi-image playback system, to which the present technique is applied, according to a fourth embodiment.

Among the configuration illustrated in FIG. 20, a same reference symbol is given to a same configuration as that in FIG. 14. A duplicated description will be suitably omitted.

The configuration of the content distribution server 11 in FIG. 20 is different from the configuration in FIG. 14 in the point that a control section 91 is disposed in place of the control section 51. The content distribution server 11 in FIG. 20 generates an encoded stream of a multi-image playback image selectively using the direct copy method and the parameter transcode method not on the basis of the permissible amount of processing, but on the basis of the degrees of importance of the individual image contents set in the above-described method.

Specifically, the control section 91 of the content distribution server 11 determines the encoded stream to a direct copy stream or a transcode stream on the basis of the degrees of importance of the encoded streams of the plurality of image contents outputted from the encoding processing section 31.

And, in the same manner as the control section 51, the control section 91 controls the selection section 52 so as to supply the direct copy stream outputted from the encoding processing section 31 to the stream combination section 32, and to supply the transcode stream to the parameter transcode processing section 53.

Description of Processing by Control Section

Figure 21:
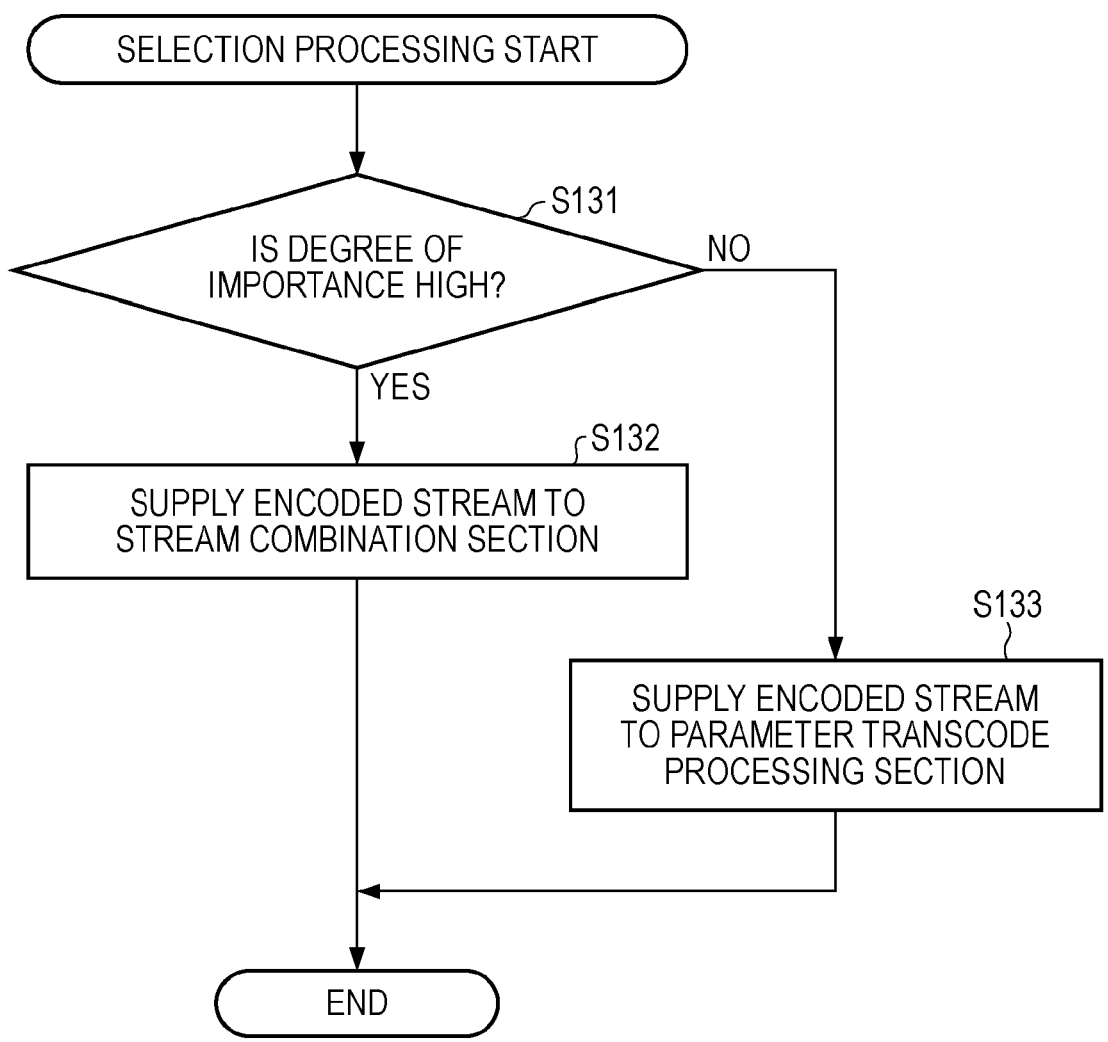
FIG. 21 is a flowchart illustrating selection processing in the control section in FIG. 20.

FIG. 21 is a flowchart illustrating selection processing by the control section 91 (FIG. 20) in the content distribution server 11. This selection processing is performed for each encoded stream of the image contents supplied from the encoding processing section 31.

In step S131 in FIG. 21, the control section 91 determines whether the degree of importance of the encoded stream of the image contents to be processed is high or not, that is to say, whether the degree of importance is not less than a threshold value. In step S131, if determined that the degree of importance of the encoded stream of the image contents to be processes is high, in step S132, the control section 91 causes the selection section 52 to supply the encoded stream to be processed to the stream combination section 32 as a direct copy stream. And the processing is terminated.

On the other hand, in step S131, if determined that the degree of importance of the encoded stream of the image contents to be processes is low, in step S133, the control section 91 causes the selection section 52 to supply the encoded stream to be processed to the parameter transcode processing section 53 as a transcode stream. And the processing is terminated.

As described above, the content distribution server 11 in FIG. 20 causes the stream combination section 32 and the parameter transcode processing section 53 to generate an encoded stream of a multi-image playback image on the basis of the degree of importance of the image contents. Accordingly, it is possible to prevent image quality deterioration of the image contents having high degree of importance in the multi-image playback image while suppressing the processing load and the bit rate.

Fifth Embodiment

Figure 22:
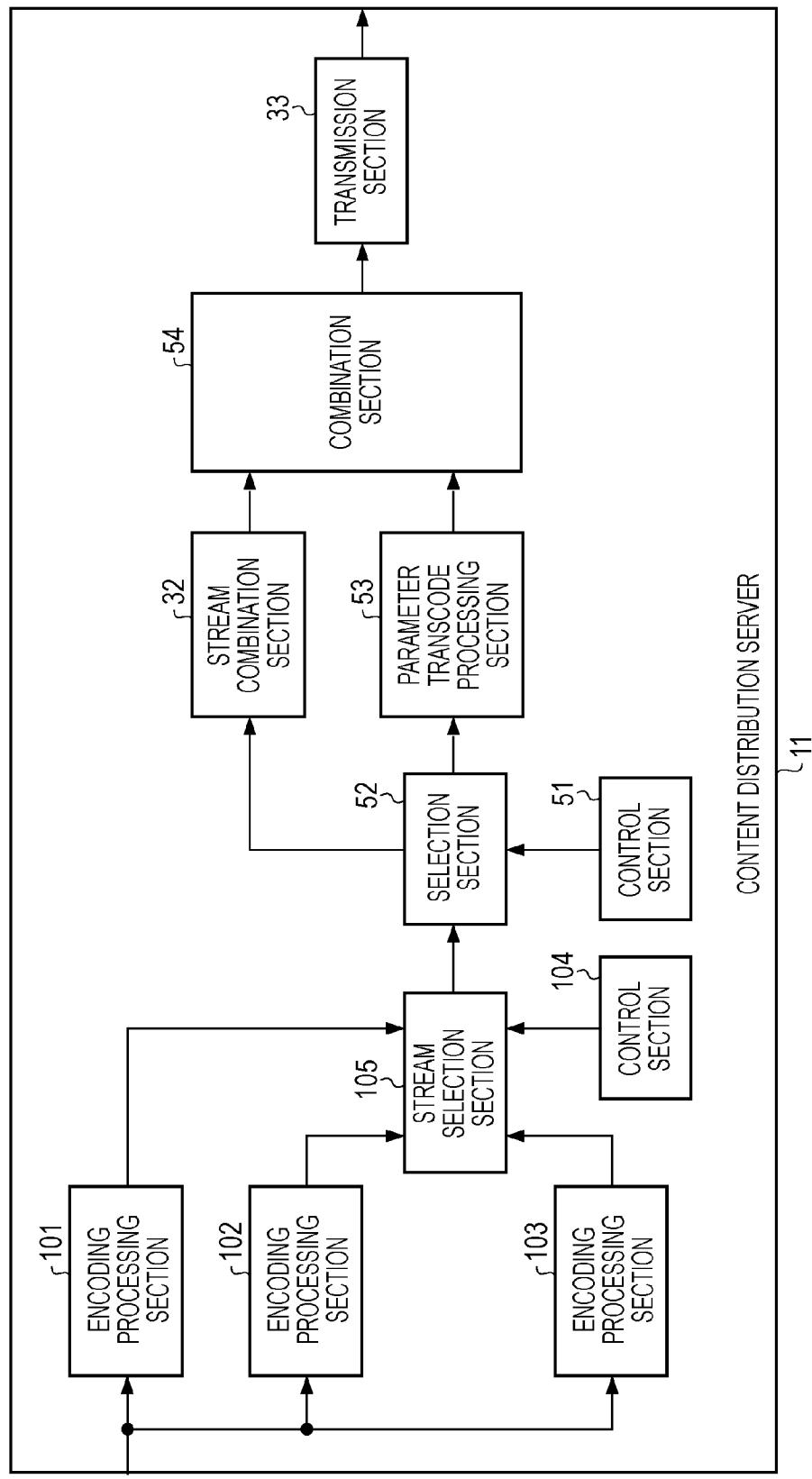
FIG. 22 is a block diagram illustrating an example of a configuration of a content distribution server in a multi-image playback system, to which the present technique is applied, according to a fifth embodiment.

Example of Configuration of Content Distribution Server According to Fifth Embodiment FIG. 22 is a block diagram illustrating an example of a configuration of the content distribution server 11 in a multi-image playback system, to which the present technique is applied, according to a fifth embodiment.

Among the configuration illustrated in FIG. 22, a same reference symbol is given to a same configuration as that in FIG. 14. A duplicated description will be suitably omitted.

The configuration of the content distribution server 11 in FIG. 22 is different from the configuration in FIG. 14 in the point that encoding processing sections 101 to 103 are disposed in place of the encoding processing section 31, and a control section 104 and a stream selection section 105 are newly disposed. The content distribution server 11 in FIG. 22 generates three kinds of encoded streams having different bit rates for the plurality of image contents individually, and then generates an encoded stream of the multi-image playback image selectively using the three kinds of encoded streams.

Specifically, the encoding processing section 101 of the content distribution server 11 receives and decodes an encoded stream of a plurality of image contents in the H.264/AVC method, etc., in the same manner as the encoding processing section 31 in FIG. 4. The encoding processing section 101 performs re-encoding on each of the plurality of image contents so as to dispose macro blocks arranged in the horizontal direction into a same slice. At this time, a picture type of the encoded stream of each of the image contents played back at the same time is made identical, and a bit rate of the encoded stream of the plurality of image contents obtained as a result of the re-encoding is set to a predetermined bit rate. The encoding processing section 101 supplies the encoded stream of the plurality of image contents obtained as a result of the re-encoding to the stream selection section 105.

The encoding processing section 102 and the encoding processing section 103 are configured in the same manner as the encoding processing section 101, and perform the same processing as the encoding processing section 101. However, the bit rate of the encoded stream of the plurality of image contents obtained as a result of the re-encoding by the encoding processing section 102 is lower than the case of the encoding processing section 101. Also, the bit rate of the encoded stream of the plurality of image contents obtained as a result of the re-encoding by the encoding processing section 103 is further lower than the case of the encoding processing section 101. That is to say, the encoding processing sections 101 to 103 generates the encoded streams of the same plurality of image contents having different bit rates, respectively.

The control section 104 controls the stream selection section 105 to supply each of the encoded streams of the plurality of image contents, which is supplied from any one of the encoding processing sections 101 to 103 on the basis of the corresponding specified rate TR, to the selection section 52.

The stream selection section 105 selects an encoded stream of the plurality of image contents, which is supplied from any one of the encoding processing sections 101 to 103 under the control of the control section 104, and supplies the encoded stream to the selection section 52.

Description of Overview of Processing by Content Distribution Server

Figure 23:
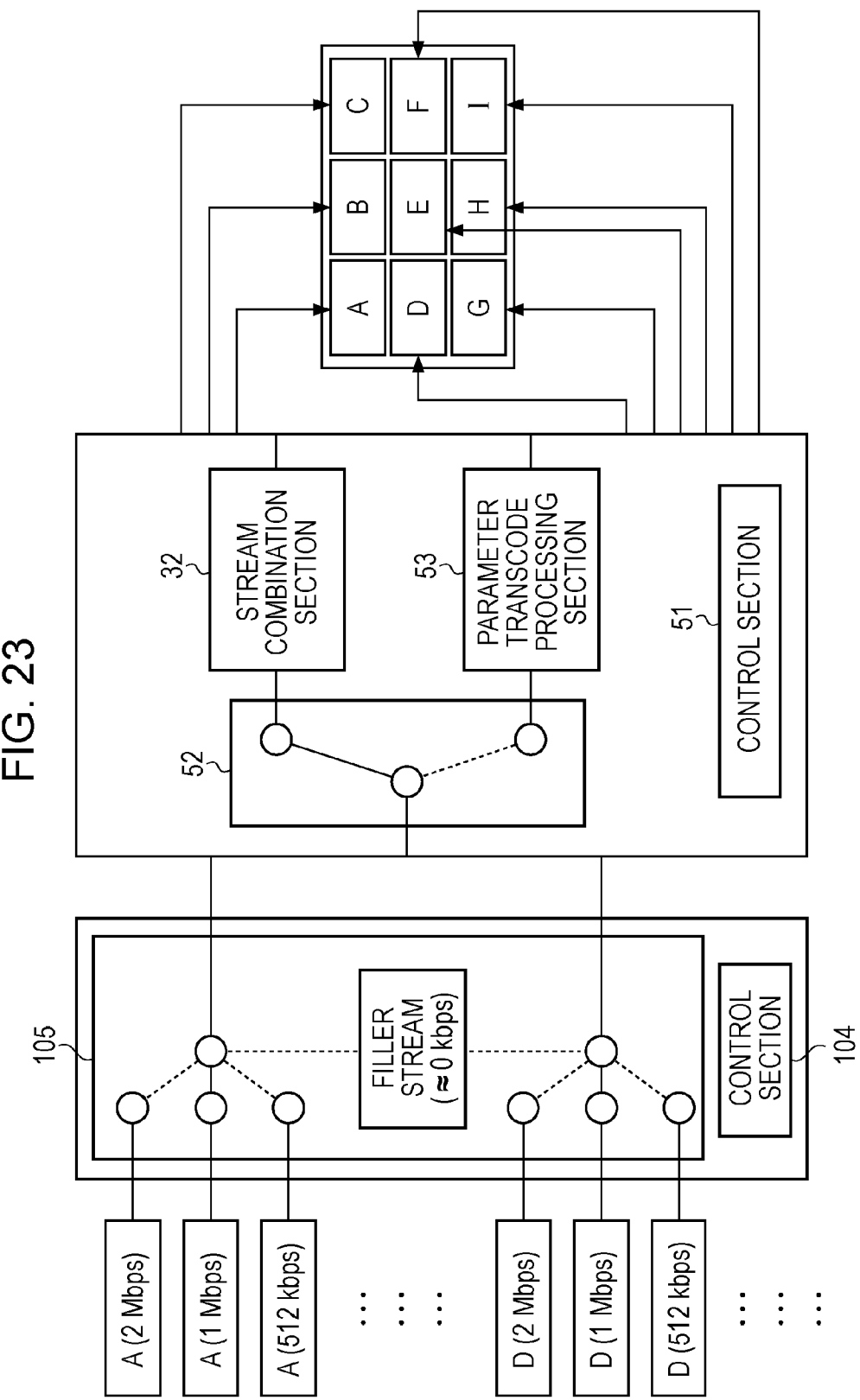
FIG. 23 is an explanatory diagram of an overview of processing in the content distribution server in FIG. 22.

FIG. 23 is an explanatory diagram of an overview of processing in the content distribution server 11 in FIG. 22.

In the example in FIG. 23, a multi-image playback image includes nine image contents A to I.

As illustrated in FIG. 23, the encoding processing section 101 to the encoding processing section 103 generate three kinds of encoded streams having different bit rates of the image contents A to I. In the example in FIG. 23, bit rates of the encoded streams generated by the encoding processing sections 101 to 103 are 2 Mbps, 1 Mbps, and 512 kbps, respectively.

The control section 104 controls the stream selection section 105 to select the encoded stream of the image contents A to I having any one kind of bit rates from the three kinds of bit rates, and supplies the encoded stream to the selection section 52.

The processing of the control section 51, the selection section 52, the stream combination section 32, and the parameter transcode processing section 53 are the same as the processing described in FIG. 15, and thus descriptions thereof will be omitted. However, in the example in FIG. 23, the bit rate of the encoded stream of the image contents, which is used for generation of the encoded stream of the multi-image playback image, is selected on the basis of the specified rate RT, and thus the encoded streams of all the image contents A to I are direct copy streams.

Description of Processing by Control Section

Figure 24:
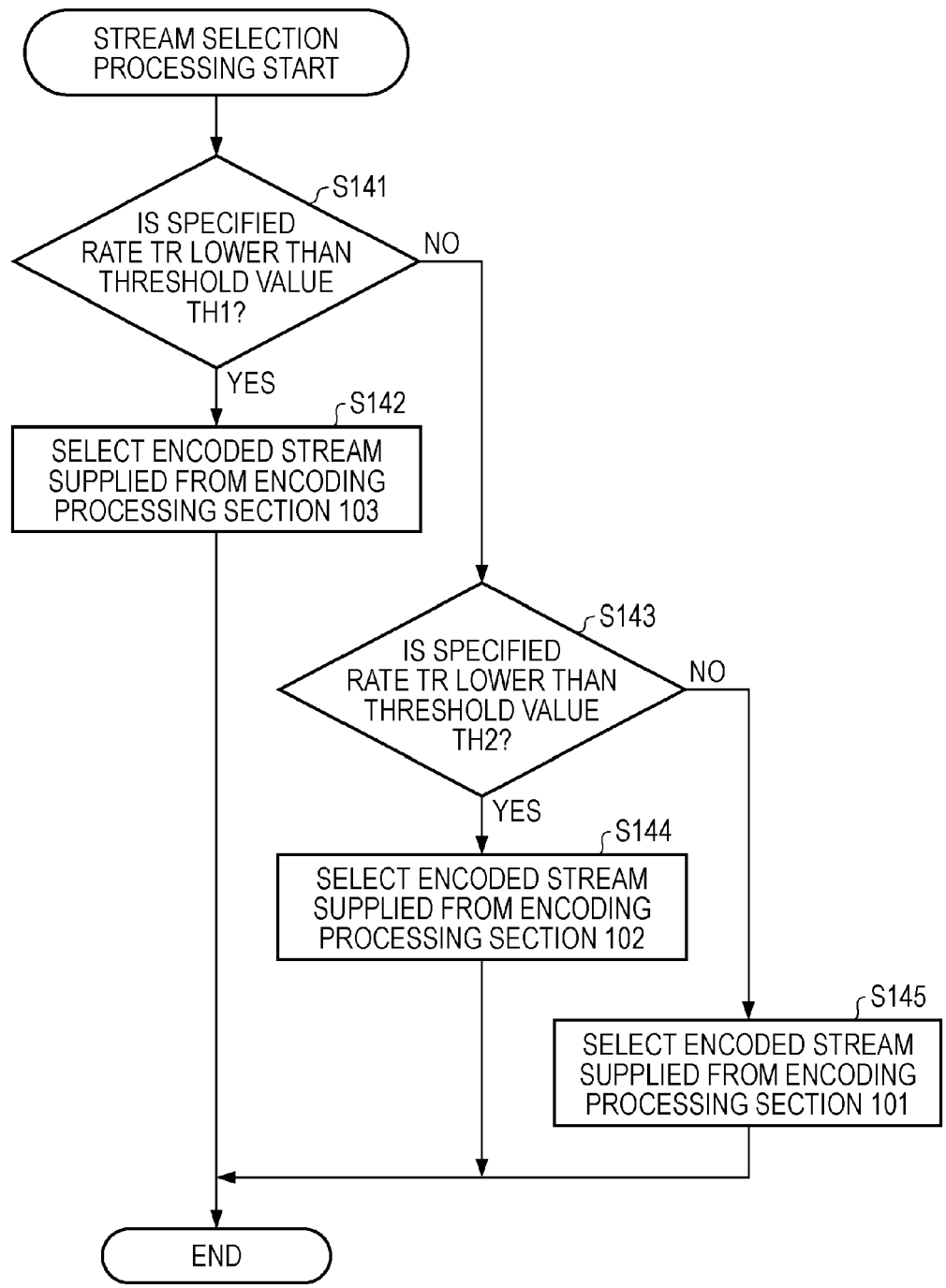
FIG. 24 is a flowchart illustrating stream selection processing in the control section in FIG. 22.

FIG. 24 is a flowchart illustrating stream selection processing by the control section 104 (FIG. 22) in the content distribution server 11.

In step S141 in FIG. 24, the control section 104 determines whether the specified rate TR is less than the threshold value TH1. In step S141, if determined that the specified rate TR is less than the threshold value TH1, in step S142, the control section 104 selects the encoded stream of the plurality of image contents supplied from the encoding processing section 103. And the control section supplies the selected encoded stream to the selection section 52, and the processing is terminated.

On the other hand, in step S141, if determined that the specified rate TR is not less than the threshold value TH1, in step S143, a determination is made of whether the specified rate TR is less than a threshold value TH2 (TH2>TH1).

In step S143, if determined that the specified rate TR is less than the threshold value TH2, in step S144, the control section 104 selects the encoded stream of the plurality of image contents supplied from the encoding processing section 102. And the control section supplies the selected encoded stream to the selection section 52, and the processing is terminated.

Also, in step S143, if determined that the specified rate TR is not less than the threshold value TH2, in step S145, the control section 104 selects the encoded stream of the plurality of image contents supplied from the encoding processing section 101. And the control section supplies the selected encoded stream to the selection section 52, and the processing is terminated.

As described above, the content distribution server 11 in FIG. 22 selects an encoded stream having a predetermined bit rate from the plurality of encoded streams having different bit rates for the plurality of image contents individually on the basis of the specified rate TR, and uses the encoded stream to generate the encoded stream of the multi-image playback image. Accordingly, the content distribution server 11 in FIG. 22 selects an encoded stream having a smaller bit rate as the specified rate TR decreases so that it is possible to reduce the number of transcodes np, and to reduce the processing load.

Also, it is possible to make quantization precision at the time of parameter transcoding closer to the original quantization precision. As a result, the difference between a quantized value Qorg of the original image contents and a re-quantized value Qcur of the image contents in the multi-image playback image becomes small. On the other hand, if the difference between the quantized value Qorg and the re-quantized value Qcur is large, in consideration of image quality, it is necessary to perform normal encoding at the time of parameter transcoding, and to change the prediction mode. Accordingly, in the content distribution server 11 in FIG. 22, it is not necessary to perform normal encoding at the time of parameter transcoding, and thus it is possible to reduce processing load, and to perform processing at a high speed.

In this regard, the bit rates of the individual image contents to be selected are the same in the fifth embodiment. However, the bit rates may be different. In this case, it is possible for the content distribution server 11 in FIG. 22 to set the degrees of importance of the individual image contents by the above-described method, and to select encoded streams having a high bit rate in descending order of the degree of importance. Also, the kinds of bit rate is not limited to three.

Also, in the fifth embodiment, the bit rate of the encoded stream of the image contents is selected on the basis of the specified rate TR. However, the bit rate may be selected on the basis of the degree of importance of the image contents, etc.

Further, in the fifth embodiment, both the direct copy method and the transcode method are selectively used. However, only the direct copy method may be used in the same manner as the first embodiment. In this case, the control section 51, the selection section 52, the parameter transcode processing section 53, and the combination section 54 in FIG. 22 are not disposed, and the encoded streams selected by the stream selection section 105 are all supplied to the stream combination section 32.

It is possible to apply the present technique to an image processing system of an encoded stream which is encoded by an encoding method other than the H.264/AVC method, such as MPEG2 (Moving Picture Experts Group phase 2), the HEVC (High Efficiency Video Coding) method, etc.

Description of Computer to which the Present Technique is Applied

The above-described series of processing can be executed by hardware or can be executed by software. When the series of processing is executed by software, programs of the software may be installed in a computer. Here, the computer includes a computer which is built in a dedicated hardware, and for example, a general-purpose personal computer, etc., capable of executing various functions by installing various programs.

FIG. 25 is a block diagram illustrating an example of a hardware configuration of the computer on which the above-described series of processing is performed by the program.

In the computer, a CPU (Central Processing Unit) 201, a ROM (Read Only Memory) 202, and a RAM (Random Access Memory) 203 are mutually connected through a bus 204.

An input/output interface 205 is further connected to the bus 204. An input section 206, an output section 207, a storage section 208, a communication section 209, and a drive 210 are connected to the input/output interface 205.

The input section 206 includes a keyboard, a mouse, a microphone, etc. The output section 207 includes a display, a speaker, etc. The storage section 208 includes a hard disk, a nonvolatile memory, etc. The communication section 209 includes a network interface, etc. The drive 210 drives a removable medium 211, such as a magnetic disk, an optical disc, a magneto-optical disc, or a semiconductor memory, etc.

In the computer having the configuration as described above, the CPU 201 loads the program stored, for example in storage section 208 to the RAM 203 through the input/output interface 205 and the bus 204 to execute the program, and thereby the above-described series of processing is performed.

It is possible to record the program to be executed on the computer (CPU 201) on a removable medium 211, for example, on a package medium, etc., and to provide the package medium. Also, it is possible to provide the program through a wired or wireless transmission medium, such as a local area network, the Internet, digital satellite broadcasting.

In the computer, it is possible to install the program into the storage section 208 through the input/output interface 205 by attaching the removable medium 211 to the drive 210. Also, it is possible to receive the program by the communication section 209 through a wired or wireless transmission medium, and to install into the storage section 208. In addition, it is possible to install the program in the ROM 202 or the storage section 208 in advance.

In this regard, the programs executed by the computer may be programs that are processed in time series in accordance with the described sequence in this specification. Alternatively, the programs may be programs to be executed in parallel or at necessary timing, such as at the time of being called, or the like.

Also, in this specification, a system represents a set of a plurality of components (apparatuses, modules (parts), etc.), and it does not matter whether all the components are included in a same case or not. Accordingly, a plurality of apparatuses that are accommodated in different cases and connected through a network, and, one apparatus including a plurality of modules in one case are all referred to as a system.

Embodiments of the present technique are not limited to the above-described embodiments. It is possible to make various changes without departing from the gist of the present technique.

For example, in the present technique, it is possible to employ a cloud-computing configuration in which one function is shared and processed in cooperation by a plurality of devices through a network.

Also, it is possible to divide and execute each step described in the flowchart described above by a plurality of apparatuses in addition to execute each step by one apparatus.

Further, if one step includes a plurality of processes, it is possible for a plurality of apparatuses to take partial charge of the plurality of processes included in the one step in addition to execution of the processes by one apparatus.

In this regard, it is possible to configure the present technique as follows.

(1) An image processing apparatus including,
using encoded streams produced by individually encoding macro blocks arranged in a horizontal direction into a same slice for a plurality of image contents, a stream combination section configured to generate an encoded stream of a multi-image playback image displaying the plurality of image contents at the same time.

(2) The image processing apparatus according to (1),
wherein the stream combination section is configured to change and combine slice headers included in the respective encoded streams of the plurality of image contents.

(3) The image processing apparatus according to (2),
wherein the stream combination section is configured to change information, included in the slice header, indicating a beginning macro block of the slice.

(4) The image processing apparatus according to (2) or (3), wherein the stream combination section is configured to change an identifier of an IDR picture included in the slice header.

(5) The image processing apparatus according to any one of (2) to (4), wherein the stream combination section is configured to change information indicating a quantization parameter included in the slice header.

(6) The image processing apparatus according to any one of (1) to (5), wherein a picture type of each of the plurality of image contents is identical.

(7) The image processing apparatus according to any one of (1) to (6), wherein for an encoded stream of a part of image contents among the plurality of image contents, the stream combination section is configured to change a slice header included in the encoded stream on the basis of a permissible amount of processing of the own image processing apparatus, a desired bit rate of the multi-image playback image, or individual degrees of importance of the plurality of encoded streams, to perform parameter transcoding on the encoded streams of remaining image contents, and thereby to generate the encoded stream of the multi-image playback image.

(8) The image processing apparatus according to (1), further including a stream selection section configured to select an encoded stream having a predetermined bit rate from a plurality of encoded streams having different bit rates for each of the plurality of image contents on the basis of a desired bit rate of the multi-image playback image, or individual degrees of importance of the plurality of image contents, wherein the stream combination section is configured to generate the encoded stream of the multi-image playback image using the individual encoded streams of the plurality of image contents selected by the stream selection section.

(9) A method of processing an image, including, using encoded streams produced by individually encoding macro blocks arranged in a horizontal direction into a same slice for a plurality of image contents, a stream combining to generate an encoded stream of a multi-image playback image displaying the plurality of image contents at the same time.

(10) An image processing system including:

a server apparatus including, using encoded streams produced by individually encoding macro blocks arranged in a horizontal direction into a same slice for a plurality of image contents, a stream combination section configured to generate an encoded stream of a multi-image playback image displaying the plurality of image contents at the same time, and a transmission section configured to transmit the encoded stream of the multi-image playback image generated by the stream combination section; and a client apparatus including, a receiving section configured to receive the encoded stream of the multi-image playback image transmitted from the transmission section, and a display control section configured to display the multi-image playback image on a predetermined display section on the basis of the encoded stream of the multi-image playback image received by the receiving section.

The present disclosure contains subject matter related to that disclosed in Japanese Priority Patent Application JP 2012-035992 filed in the Japan Patent Office on Feb. 22, 2012, the entire contents of which are hereby incorporated by reference.

What is claimed is:

1. An image processing apparatus, comprising:
   a control section configured to determine a transcode stream based on information that indicates a number of client apparatuses communicably connected to the image processing apparatus; and
   an encoding processing section configured to individually encode macro blocks arranged in a horizontal direction for a plurality of image contents into a slice to produce encoded streams;
   a stream combination section configured to:
     generate one or more encoded streams of a multi-image playback image that concurrently displays the plurality of image contents based on the encoded streams and the transcode stream; and
     rewrite slice headers of the encoded streams of the plurality of image contents based on a data length of a unit of the slice and a number of macro blocks of the slice.

2. The image processing apparatus according to claim 1, wherein the stream combination section is configured to rewrite and combine the slice headers included in the respective encoded streams of the plurality of image contents.

3. The image processing apparatus according to claim 1, wherein the stream combination section is configured to change information included in the slice header that indicates an address of the beginning macro block of the slice.

4. The image processing apparatus according to claim 1, wherein the stream combination section is configured to change an identifier of an IDR picture included in the slice header.

5. The image processing apparatus according to claim 1, wherein the stream combination section is configured to change information that indicates a quantization parameter included in the slice header.

6. The image processing apparatus according to claim 1, wherein a picture type of each of the plurality of image contents is identical.

7. The image processing apparatus according to claim 1, wherein, for an encoded stream of a part of image contents among the plurality of image contents, the stream combination section is configured to change the slice header included in the encoded stream based on a permissible amount of processing associated with the image processing apparatus, a desired bit rate of the multi-image playback image, or individual degrees of importance of the plurality of encoded streams, to perform parameter transcoding on the encoded streams of remaining image contents, and thereby to generate the one or more encoded streams of the multi-image playback image.

8. The image processing apparatus according to claim 1, further comprising a stream selection section configured to select an encoded stream that has a determined bit rate from a plurality of encoded streams that have different bit rates for each of the plurality of image contents based on a desired bit rate of the multi-image playback image, or individual degrees of importance of the plurality of image contents, wherein the stream combination section is configured to generate the one or more encoded streams of the multi-image playback image based on the individual encoded streams of the plurality of image contents selected by the stream selection section.

9. A method of processing an image by an image processing apparatus, the method comprising:
   determining, by one or more processors of the image processing apparatus, a transcode stream based on information indicating a number of client apparatuses communicably connected to the image processing apparatus;
   generating, by the one or more processors, using encoded streams produced by individually encoding macro blocks arranged in a horizontal direction into a same slice for a plurality of image contents, one or more encoded streams of a multi-image playback image that concurrently displays the plurality of image contents based on the transcode stream; and
   rewriting, by the one or more processors, slice headers of the encoded streams of the plurality of image contents based on a data length of a unit of the slice and a number of macro blocks of the slice.

10. An image processing system, comprising:
   a server apparatus comprising:
      a control section configured to determine a transcode stream based on information that indicates a number of client apparatuses communicably connected to the server apparatus;
      an encoding processing section configured to individually encode macro blocks arranged in a horizontal direction for a plurality of image contents into a slice to produce encoded streams;
      a stream combination section configured to:
         generate one or more encoded streams of a multi-image playback image that concurrently displays the plurality of image contents based on the encoded streams and the transcode stream; and
         rewrite slice headers of the encoded streams of the plurality of image contents based on a data length of a unit of the slice and a number of macro blocks of the slice; and
      a transmission section configured to transmit the one or more encoded streams of the multi-image playback image generated by the stream combination section; and
   each of the client apparatuses comprising:
      a receiving section configured to receive the one or more encoded streams of the multi-image playback image transmitted from the transmission section; and
      a display control section configured to display the multi-image playback image on a display section based on the one or more encoded streams of the multi-image playback image received by the receiving section.

11. The image processing apparatus according to claim 1, wherein the beginning macro block is at leftmost position in the horizontally arranged slice, and the beginning macro block is encoded without referencing to the other macro blocks in the plurality of image contents.

12. The image processing apparatus according to claim 1, wherein the stream combination section is further configured to recognize the number of the macro blocks in the slice from the encoded streams for the plurality of image contents.

13. The image processing apparatus according to claim 12, wherein the information associated with the beginning macro block among the macro blocks in the slice header of the slice is changed based on the recognized number of the macro blocks in the slice from the encoded streams for the plurality of image contents.

* * * * *